(12) United States Patent
Maeda

(10) Patent No.: US 7,231,043 B2
(45) Date of Patent: Jun. 12, 2007

(54) DATA PROCESSING APPARATUS AND METHOD, AND COMPUTER-READABLE STORAGE MEDIUM ON WHICH PROGRAM FOR EXECUTING DATA PROCESSING IS STORED

(75) Inventor: Mitsuru Maeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 951 days.

(21) Appl. No.: 09/879,913

(22) Filed: Jun. 14, 2001

(65) Prior Publication Data

US 2002/0018580 A1 Feb. 14, 2002

(30) Foreign Application Priority Data

Jun. 20, 2000 (JP) ............................. 2000-184726

(51) Int. Cl.
*H04L 9/32* (2006.01)
*H04N 7/16* (2006.01)
*H04K 1/00* (2006.01)

(52) U.S. Cl. ........................ 380/202; 380/217; 705/51; 725/31; 726/27

(58) Field of Classification Search ................ 713/176, 713/168; 705/51–59; 707/1, 9, 10; 380/200, 380/201, 202; 726/26–33
See application file for complete search history.

(56) References Cited

U.S. PATENT DOCUMENTS 5,353,062 A 10/1994 Maeda
2001/0016851 A1* 8/2001 Gramsamer et al. ........ 707/200

FOREIGN PATENT DOCUMENTS

WO WO 9948296 A1 * 9/1999

* cited by examiner

*Primary Examiner*—Kambiz Zand
*Assistant Examiner*—Matthew Heneghan
(74) *Attorney, Agent, or Firm*—Fitzpatrick, Cella, Harper & Scinto

(57) ABSTRACT

Input material data is encoded to form contents data. Intellectual property information on intellectual property rights in technological aspects necessary for forming the contents data is formed. The intellectual property information is added to the contents data.

7 Claims, 18 Drawing Sheets

PRIOR ART

PRIOR ART

FIG. 13

| SYSTEM ENCODING PROGRAM |
| --- |
| VIDEO ENCODING PROGRAM |
| AUDIO ENCODING PROGRAM |
| ENCRYPTING PROGRAM |
| SYSTEM PATENT CODE |
| VIDEO PATENT CODE |
| AUDIO PATENT CODE |
| IPMP ENCODING PROGRAM |
| MULTIPLEXING PROGRAM |
| COMMUNICATION PROGRAM |

FIG. 16

| SYSTEM DECODING PROGRAM |
|---|
| VIDEO DECODING PROGRAM |
| AUDIO DECODING PROGRAM |
| DECRYPTING PROGRAM |
| SYSTEM PATENT CODE |
| VIDEO PATENT CODE |
| AUDIO PATENT CODE |
| IPMP DECODING PROGRAM |
| DEMULTIPLEXING PROGRAM |
| CONTENTS EXECUTION PROGRAM |
| COMMUNICATION PROGRAM |

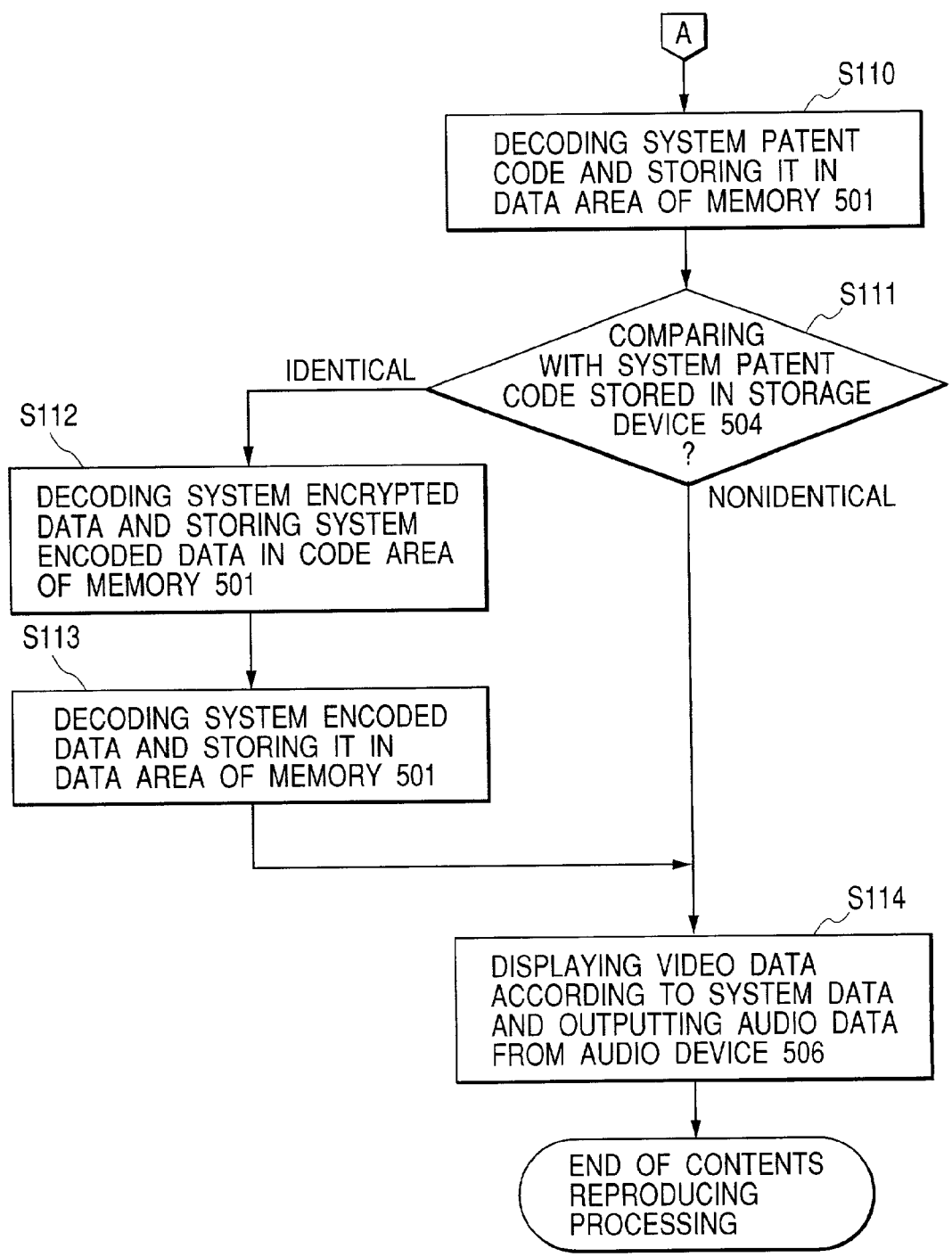

DATA PROCESSING APPARATUS AND METHOD, AND COMPUTER-READABLE STORAGE MEDIUM ON WHICH PROGRAM FOR EXECUTING DATA PROCESSING IS STORED

BACKGROUND OF THE INVENTION

1. Field of the Invention

The present invention relates to a data processing apparatus, a data processing method, and a computer-readable recording medium on which a program for executing data processing is stored and, more particularly, to data processing for protection of intellectual property rights in technological aspects (e.g., patent rights and utility model rights) required for production and/or reproduction of contents data.

2. Related Background of Art

In recent years, the international standardization of coding of data of images, videos, speech, audios, computer graphics, etc., has been advanced and the development of multimedia using such contents has also been promoted. In particular, in ISO/IEC14496 (MPEG (Moving Picture Experts Group)-4), the international standardization of a multimedia coding system (compression format) is being advanced.

In the ISO/IEC14496 standard, the spatial and temporal placement of each media, as well as ordinary coding of video and audio data, can be defined, which is called scene description. Also, each media is called an object.

FIG. 1 is a diagram for explaining an example of a scene which can be expressed in the MPEG-4 coding system.

In the example shown in FIG. 1, a box 601, a cylinder 602, an image texture applied to the box, and video texture applied to the cylinder, are defined as graphic objects, and audio 603 to be reproduced is also defined.

As a technique for scene description itself, BIFS (Binary Format for Scene description) function-extended and designed for binarization on the basis of VRML (Virtual Reality Modeling Language) is adopted. The binarization method for BIFS will not be described.

Apart from this scene description, data designating attributes of each object called "object descriptor" (referred to as OD, hereinafter) is added. Examples of attributes designated by OD are media attributes (video, audio, image, etc.), copyright holder information, Qos (quality of service) information, and content rating information. Such attributes themselves are contained as individual descriptors in OD.

FIG. 2 is a diagram showing an example of a bit stream in accordance with the MPEG-4 coding system.

Referring to FIG. 2, an initial OD 1401 stores properties of the entire bit stream (a bit stream profile, etc.), and a BIFS stream 1402 stores scene information.

An OD 1403 describes attributes of following objects. In this embodiment, the bit stream has two ODs (OD1 (1403)), (OD2 (1406)). Each OD can describe a plurality of elementary stream descriptors (referred to as ESDs (1404, 1407), hereinafter) indicating attributes of media streams (called elementary streams (referred to as ES, hereinafter)). ESs in the ODs are ESs1 (1409, 1411, 1413, 1415) and ESs2 (1410, 1412, 1414, 1416).

Also, according to the ISO/IEC14496 standard, copyright management information and access control information can be added to each OD with respect to each ES. This kind of information is called IPMP (intellectual property management and protection) information. Details of IPMP information itself are described by a descriptor called an IPMP descriptor. In actuality, a cryptographic technique is often used for access control. However, no method (descriptor syntax) has been specified for IPMP, and a description of IPMP information is syntax-free. Only a system type number registered in a registration authority (RA) is described.

Each of the above-described OD, ESD, IPMP descriptor must be placed at a leading position in the stream prior to the elementary streams, as shown in FIG. 2. However, addition, elimination and change of each descriptor is possible if an update command is inserted in the stream.

Actually, the elementary streams are packetized to form a sync layer packet (SL packet). A SLConfig descriptor (SLConfig (1405, 1408)) is also attached to each ESD.

On the other hand, IPMP information itself, described by an IPMP descriptor, can have an ES for IPMP (IPMP_ES) added to it by a link using an ID.

FIG. 3 shows an example of a bit stream to which ESs for IPMP are added.

Referring to FIG. 3, IPMP1 (1501) and IPMP2 (1502) are IPMP_ES related to ES1 and ES2, respectively. In this bit stream, a command (1503) for updating IPMP information is inserted in one place.

FIG. 4 shows details of an example of an IPMP descriptor.

Referring to FIG. 4, a descriptor tag 1601 is provided as information indicating the kind of the descriptor. A length field 1602 indicates the entire length (number of bytes) of this descriptor. A field 1603 contains a descriptor ID. A field 1604 contains IPMPS_Type, which represents a security type number, as mentioned above. A field 1605 is an optional field in which data accompanying IPMP can be inserted as desired. In this option field, syntax-free description is made.

FIG. 5 is a diagram showing an example of a system encoder for forming the above-described bit stream.

Referring to FIG. 5, object descriptor generators 1701 generate the above-described descriptors according to the properties of a bit stream.

Media encoders 1702 are a unit in which video data, audio data, etc., are actually encoded. A BIFS encoder 1704 binarises scene information. An IPMP controller 1703 controls the encoder according to IPMP descriptors and IPMP_ES (for example, controls execution of encrypting processing).

An update controller 1705 inserts a command for updating properties of ODs, ESDs, IPMP descriptors when necessary. A multiplexer 1706 finally multiplexes descriptors generated as described above and media streams into one SL packet.

FIG. 6 is a diagram showing an example of a system decoder for decoding the above-described bit stream.

Referring to FIG. 6, a demultiplexer 1801 discriminates descriptors and ESs from each other. A descriptor parser 1802 identifies each kind of descriptor from tag information, deciphers the contents of each kind of descriptor, and sets them in corresponding sections.

A BIFS decoder 1803 decodes a binarized BIFS stream to reconstruct a scene structure. Media decoders 1804 are sections in which different kinds of media data, such as video data, audio data, and image data, are actually decoded. A renderer 1807 is a mechanism for suitably displaying and reproducing each object according to the scene structure.

An IPMP controller 1805 controls reproduction of each media according to information through IPMP descriptors and IPMP_ES. For example, when encrypted data is received, the IPMP controller 1805 decrypts the data and then transfers the decrypted data to the media decoder. A sync controller 1806 controls synchronization among respective media data.

The process for transferring data from the encoder shown in FIG. 5 to the decoder shown in FIG. 6 will not be specially described. Ordinarily, in the case of transmission over a network, data is transmitted or received as one bit stream in one session.

With the development of complicated high-function coding systems such as MPEG coding systems, there have been increasing movements, among organizations and enterprises concerned with standardization processes, toward demanding payment of royalties for techniques to recover the standardization cost. Actually, a patent licensing corporation was established for management of MPEG-2 to charge companies at a fixed rate with respect to each of their products for payment of royalties for important patents relating to MPEG-2. Manufacturers of codecs have become licensees to be collectively licensed under patents relating to MPEG-2 and are paying royalties.

MPEG-4, however, allows a large number of combinations of tools unlike MPEG-2 the usage of which is comparatively limited to broadcasting and digital storage media.

For example, in Simple Profile, tools for encoding of I-VOP (Intra-coded VOP(Video Object Plane)), P-VOP (Predictive-coded VOP), AC/DC prediction, etc., at an encoding rate of 384 kbps or lower are used to perform coding limited to rectangular shapes. In Core Profile, at an encoding rate not exceeding 2 Mbps, tools for encoding arbitrary shapes and B-VOP (Bidirectionally Predictive-coded VOP) are added to those for Simple Profile. Thus, the MPEG-4 coding system is very complicated.

If a patent licensing method such as that for MPEG-2 is used for MPEG-4, inequitable charging occurs since the tools of MPEG-4 are variously selected and used. A method of setting charges with respect to each profile and a method of setting combinations and setting charges with respect to the combinations also cause inequities. For example, even use of Simple Profile tools alone at an encoding rate of 1 Mbps incurs a royalty for arbitrary shape encoding.

SUMMARY OF THE INVENTION

In view of the above-described circumstances, an object of the present invention is to provide a data processing apparatus and method which enable easier, reliable collection of royalties on the basis of intellectual property rights in technological aspects (e.g., patent rights and utility model rights) as well as provision of information on intellectual property rights in technological aspects for the purpose of preventing, for example, reproduction with an unauthorized codec, and to provide a computer-readable recording medium on which a program for executing data processing in accordance with the data processing method is stored.

To achieve this object, according to one aspect of the present invention, there is provided a data processing apparatus comprising input means for inputting material data, encoding means for encoding the material data to form contents data, forming means for forming intellectual property information on intellectual property rights in technological aspects necessary for forming the contents data, and addition means for adding to the contents data the intellectual property information formed by the forming means.

According to another aspect of the present invention, there is provided a data processing apparatus comprising input means for inputting material data, encoding means for encoding the material data to form contents data, forming means for forming intellectual property information on intellectual property rights in technological aspects necessary for decoding the contents data, and addition means for adding to the contents data the intellectual property information formed by the forming means.

According to still another aspect of the present invention, there is provided a data processing apparatus comprising input means for inputting encoded contents data and intellectual property information on intellectual property rights in technological aspects necessary for forming the contents data, discrimination means for discriminating on the basis of the intellectual property information whether use of the intellectual property rights in the technological aspects are authorized, decoding means for decoding the contents data, and control means for controlling the decoding means according to the result of the discrimination made by the discrimination means.

According to yet another aspect of the present invention, there is provided a data processing apparatus comprising input means for inputting encoded contents data and intellectual property information on intellectual property rights in technological aspects necessary for decoding the contents data, discrimination means for discriminating on the basis of the intellectual property information whether use of the intellectual property rights are authorized, decoding means for decoding the contents data, and control means for controlling the decoding means according to the result of the discrimination made by the discrimination means.

According to still another object of the present invention, there is provided a data processing method comprising an input step of inputting material data, an encoding step of encoding the material data to form contents data, a forming step of forming intellectual property information on intellectual property rights in technological aspects necessary for forming the contents data, and an addition step of adding to the contents data the intellectual property information formed in the forming step.

According to a yet another aspect of the present invention, there is provided a data processing method comprising an input step of inputting material data, an encoding step of encoding material data to form contents data, a forming step of forming intellectual property information on intellectual property rights in technological aspects necessary for decoding the contents data, and an addition step of adding to the contents data the intellectual property information formed in the forming step.

According to a further aspect of the present invention, there is provided a data processing method comprising an input step of inputting encoded contents data and intellectual property information on intellectual property rights in technological aspects necessary for forming the contents data, a discrimination step of discriminating on the basis of the intellectual property information whether use of the intellectual property rights in the technological aspects are authorized, a decoding step of decoding the contents data, and a control step of controlling the decoding step according to the result of the discrimination made in the discrimination step.

According to a still further aspect of the present invention, there is provided a data processing method comprising an input step of inputting encoded contents data and intellectual property information on intellectual property rights in technological aspects necessary for decoding the contents data, a discrimination step of discriminating on the basis of the intellectual property information whether use of the intellectual property rights are authorized, a decoding step of decoding the contents data, and a control step of controlling the decoding step according to the result of the discrimination made in the discrimination step.

According to a still further aspect of the present invention, there is provided a computer-readable storage medium storing the following data processing program codes comprising a code for an input step of inputting material data; a code for an encoding step of encoding material data to form contents data; a code for a forming step of forming intellectual property information on intellectual property rights in technological aspects necessary for forming the contents data; and a code for an addition step of adding to the contents data the intellectual property information formed in the forming step.

According to a still further aspect of the present invention, there is provided a computer-readable storage medium storing data processing program codes comprising a code for an input step of inputting material data; a code for an encoding step of encoding material data to form contents data; a code for a forming step of forming intellectual property information on intellectual property rights in technological aspects necessary for decoding the contents data; and a code for an addition step of adding to the contents data the intellectual property information formed in the forming step.

According to a still further aspect of the present invention, there is provided a computer-readable storage medium storing the following data processing program codes comprising a code for an input step of inputting encoded contents data and intellectual property information on intellectual property rights in technological aspects necessary for forming the contents data; a code for a discrimination step of discriminating on the basis of the intellectual property information whether use of the intellectual property rights in the technological aspects are authorized; a code for a decoding step of decoding the contents data; and a code for a control step of controlling the decoding step according to the result of the discrimination made in the discrimination step.

According to a still further aspect of the present invention, there is provided a computer-readable storage medium storing data processing program codes comprising a code for an input step of inputting encoded contents data and intellectual property information on intellectual property rights in technological aspects necessary for decoding the contents data; a code for discrimination step of discriminating on the basis of the intellectual property information whether use of the intellectual property rights are authorized; a code for a decoding step of decoding the contents data; and a code for a control step of controlling the decoding step according to the result of the discrimination made in the discrimination step.

Other objects, features and advantages of the present invention will become apparent from the following detailed description taken in conjunction with the accompanying drawings.

BRIEF DESCRIPTION OF THE DRAWINGS

FIG. 13 is a diagram showing an example of software stored in storage device 504 in the fifth embodiment of the present invention;

FIG. 16 is a diagram showing an example of software stored in storage device 504 in the fifth embodiment of the present invention;

FIG. 18 is another flowchart for explaining the operation in the sixth embodiment of the present invention with respect to reproduction of contents.

DETAILED DESCRIPTION OF THE PREFERRED EMBODIMENTS

A first embodiment of the present invention will be described with reference to the accompanying drawings.

Figure 1:
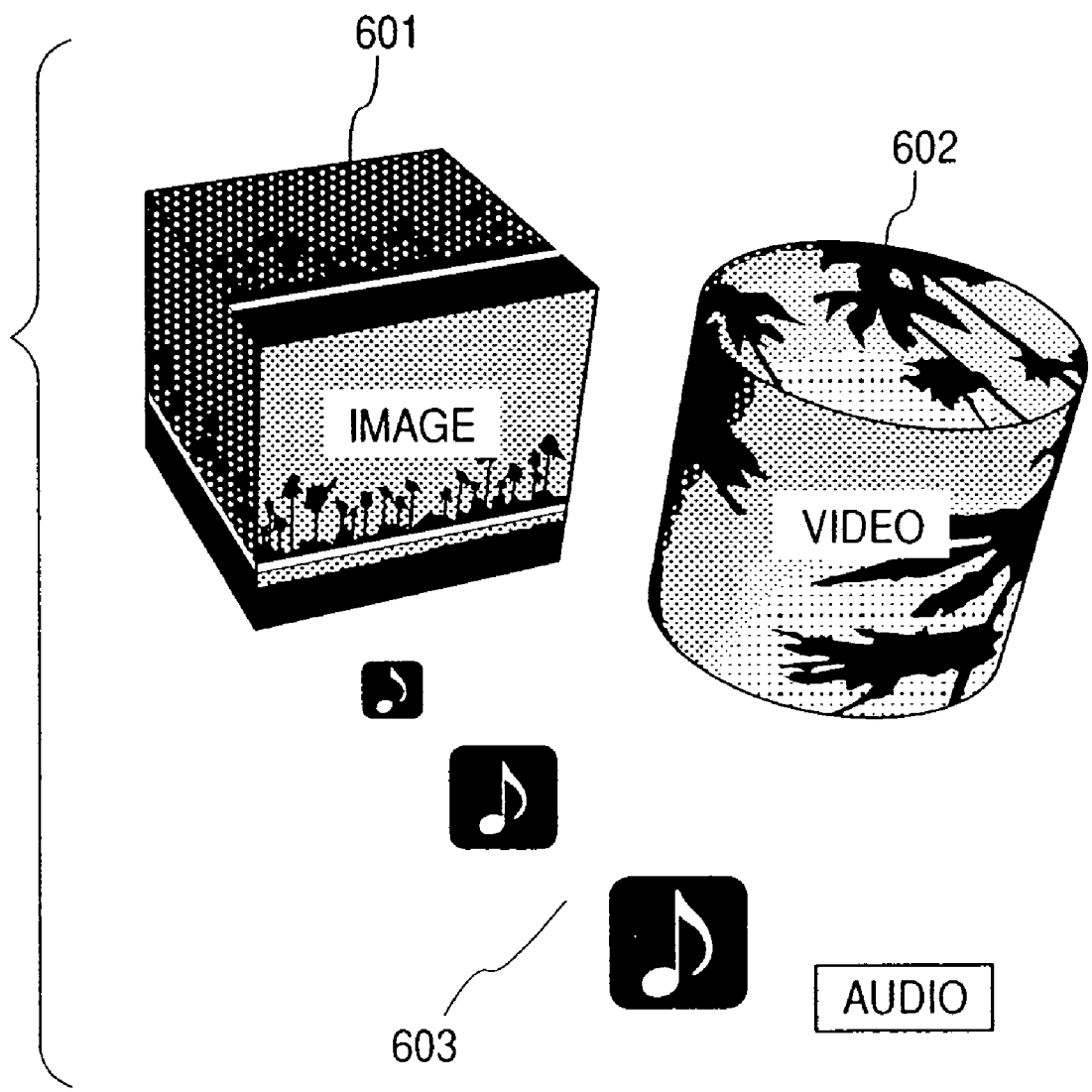
FIG. 1 is a diagram showing an example of a scene representable by the MPEG-4 coding system.
Figure 2:
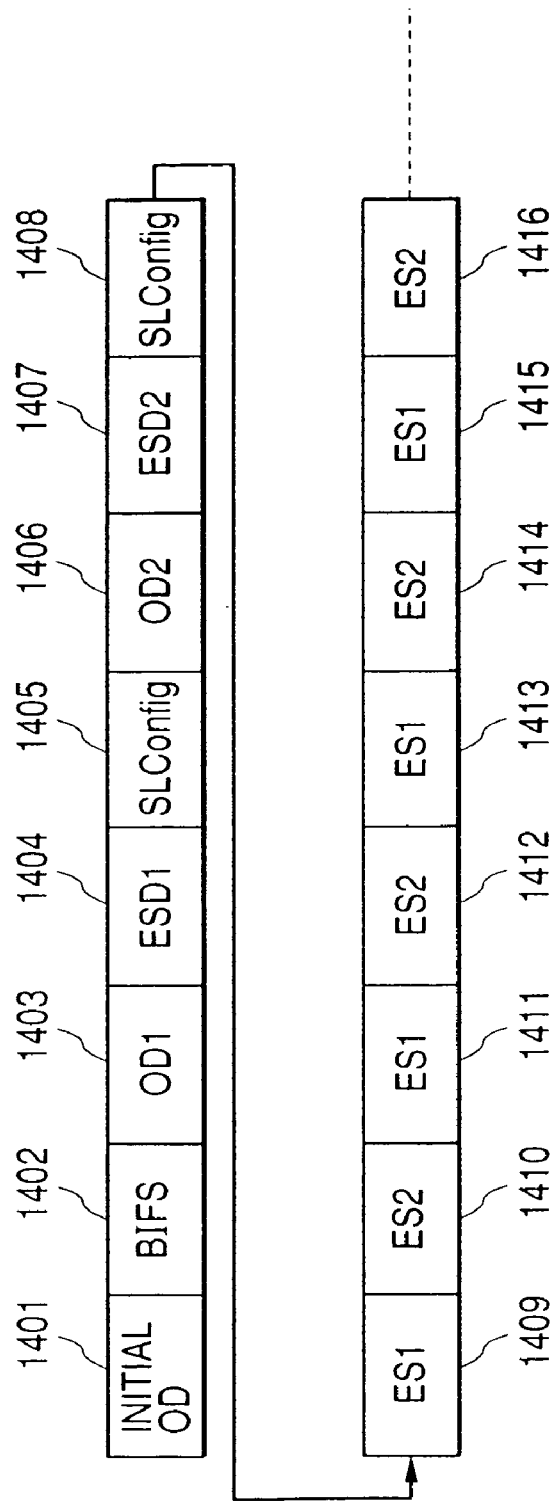
FIG. 2 is a diagram showing an example of a bit stream in accordance with the MPEG-4 coding system.
Figure 3:
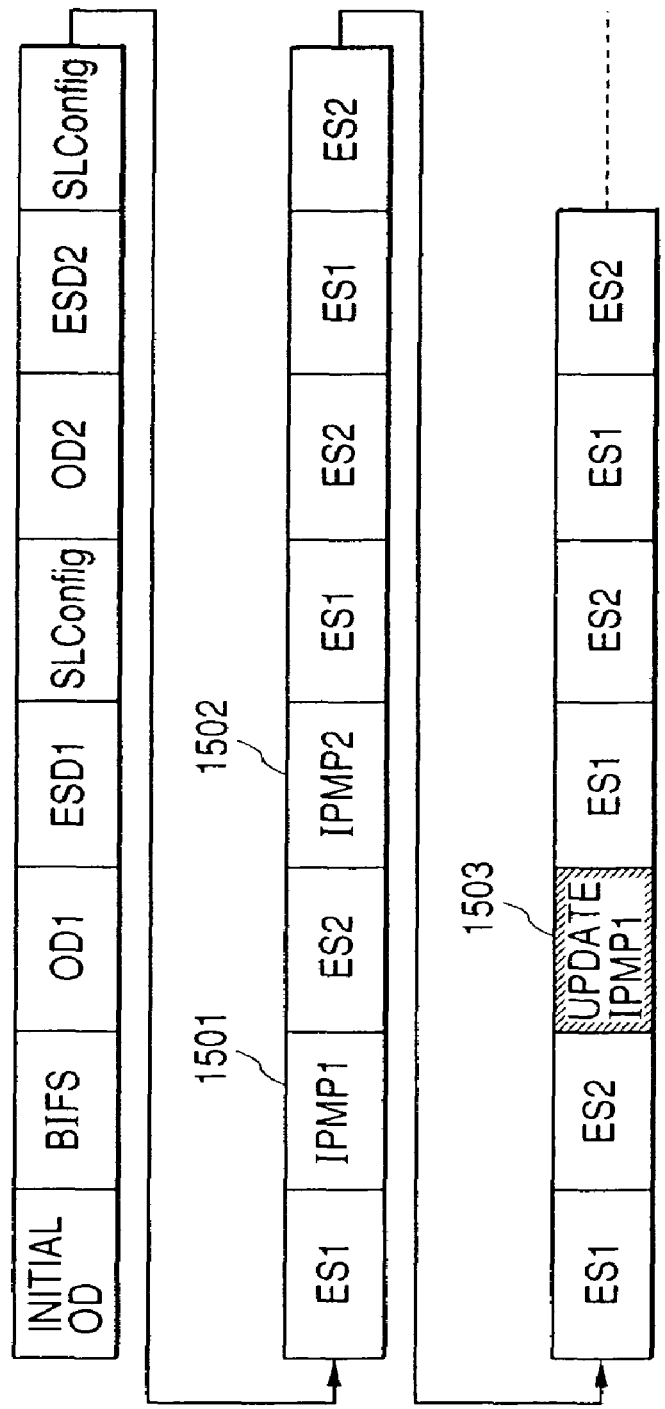
FIG. 3 is a diagram showing an example of a bit stream to which ESs for IPMP are added.
Figure 4:
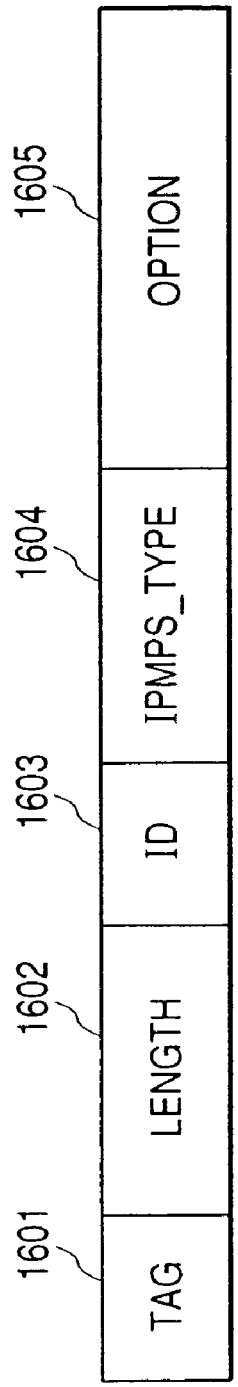
FIG. 4 is a diagram showing details of an IPMP descriptor.
Figure 5:
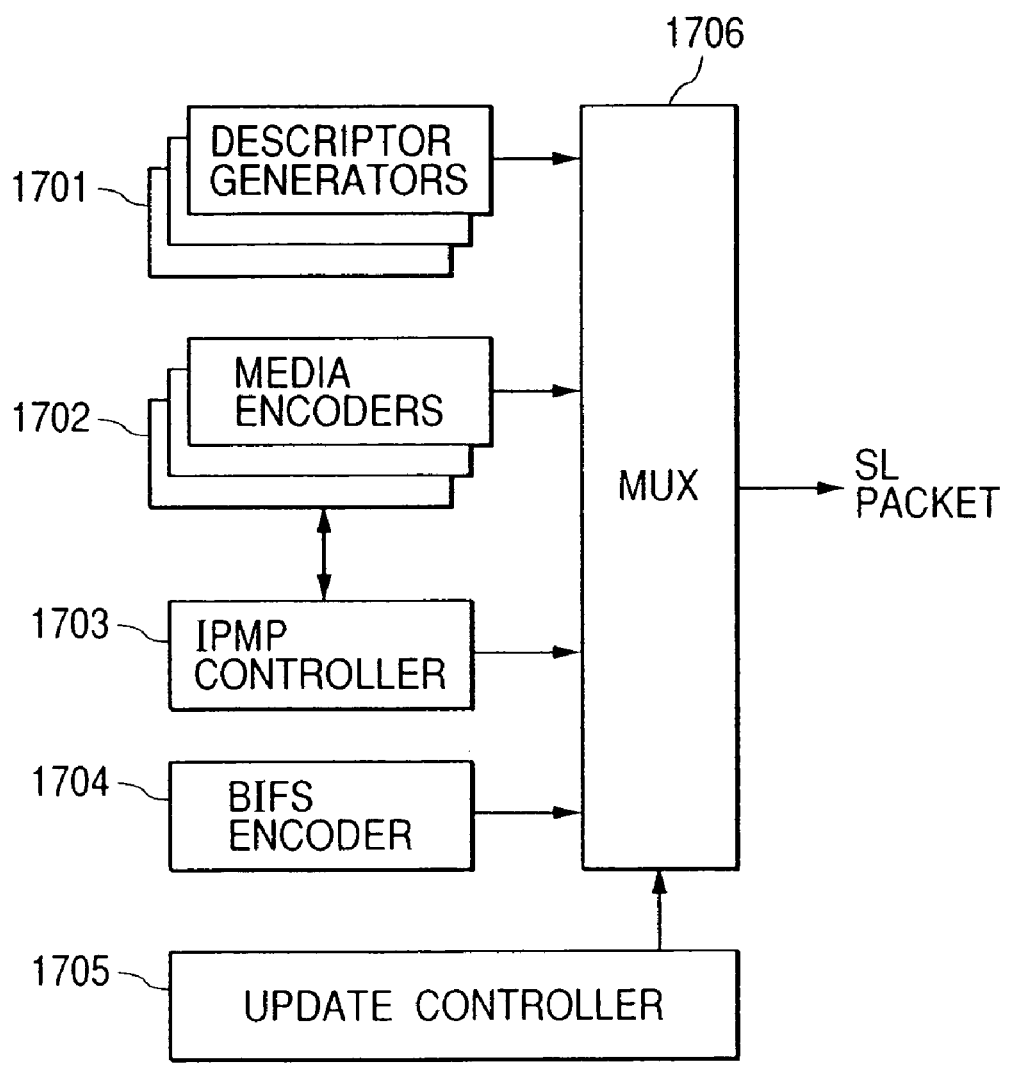
FIG. 5 is a diagram showing an example of a system encoder in accordance with the MPEG-4 coding system.
Figure 6:
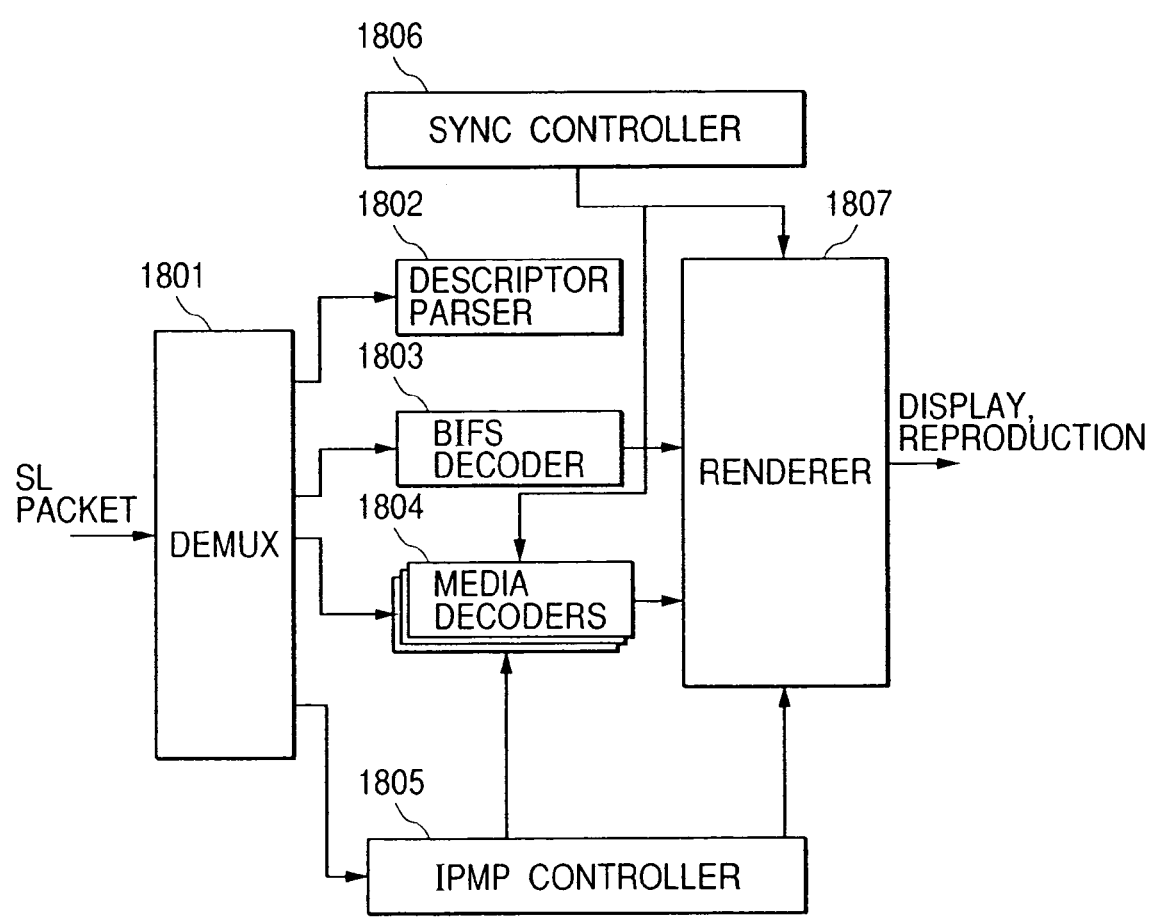
FIG. 6 is a diagram showing an example of a system decoder in accordance with the MPEG-4 coding system.
Figure 7:
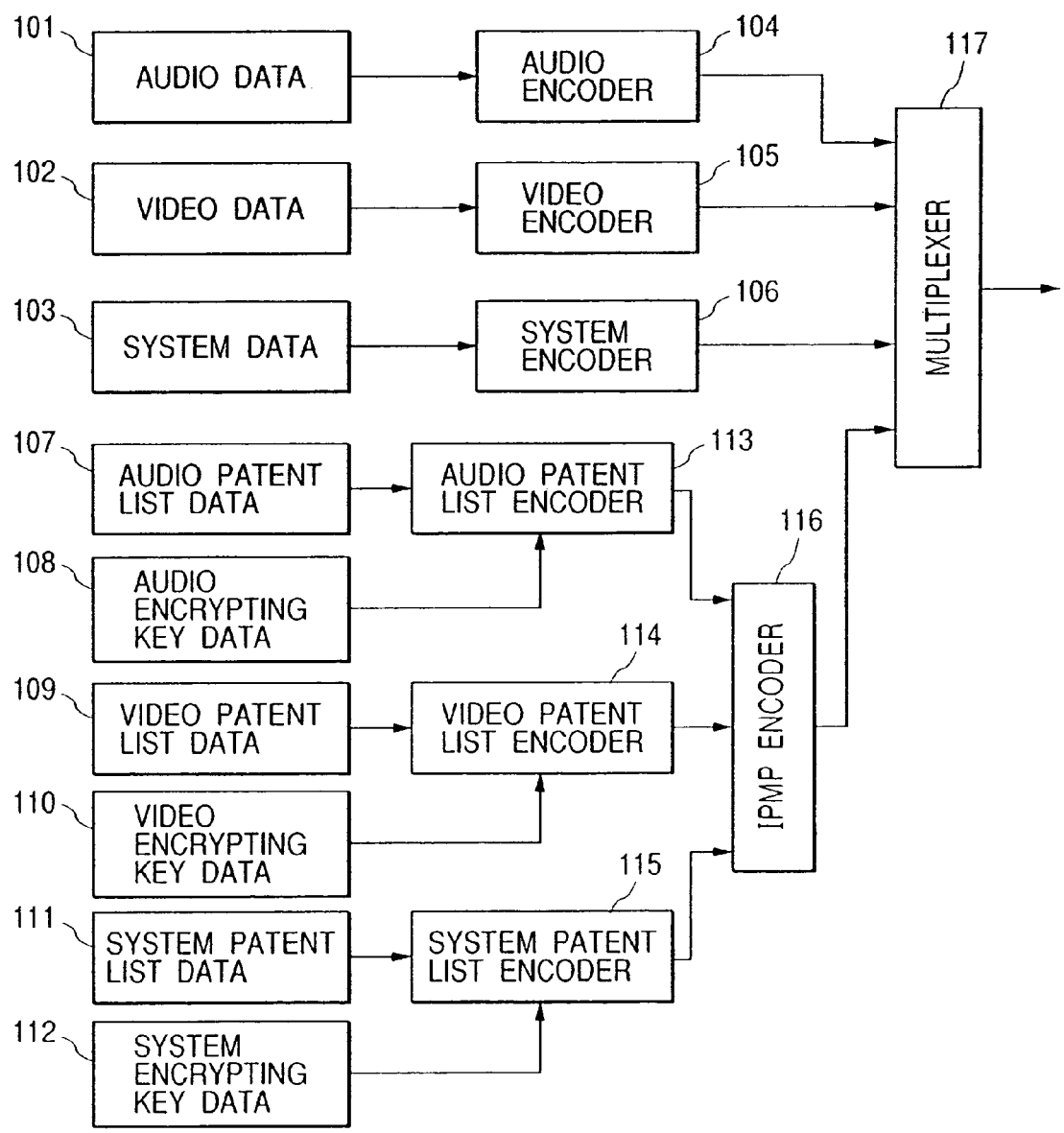
FIG. 7 is a block diagram showing the configuration of a data processing apparatus which represents a first embodiment of the present invention.

FIG. 7 is a block diagram showing the configuration of a data processing apparatus which represents a first embodiment of the present invention. This embodiment will be described with respect to a case where the MPEG-4 coding system (ISO/IEC 14496) is used.

Referring to FIG. 7, the data processing apparatus is supplied with audio data 101, video data 102, and system data 103 described in VRML or the like.

The data processing apparatus has an audio encoder 104 for encoding data by the audio encoding system in the MPEG-4 coding system, a video encoder 105 for encoding data by the video encoding system in the MPEG-4 coding system, and a system encoder 106 for encoding data by the BIFS encoding system in the MPEG-4 coding system.

The data processing apparatus is supplied with patent list data 107 of a list of patents indispensable for the audio encoding system (i.e., a registration of patents and utility models indispensable for audio encoding and decoding). This data comprises information on patent licenses issued from a patent licensing corporation. A "patent list" referred to below contains information on patents and utility model.

The data processing apparatus is also supplied with audio encrypting key data 108 indicating the existence of licenses from the patent licensing corporation. Audio encrypting key data 108 is used to encrypt a patent list. For example, this encrypting key data is provided by the patent licensing corporation.

The data processing apparatus is also supplied with patent list data 109 of a list of patents indispensable for the video encoding system and licensed by the patent licensing corporation (i.e., a registration of patents and utility models indispensable for video encoding and decoding), and video encrypting key data 110 indicating the existence of licenses from the patent licensing corporation and used to encrypt a patent list.

The data processing apparatus is also supplied with patent list data 111 of a list of patents indispensable for the BIFS encoding system which is a system encoding system and licensed by the patent licensing corporation (i.e., a registration of patents and utility models indispensable for system encoding and decoding), and system encrypting key data 112 indicating the existence of licenses from the patent licensing corporation and used to encrypt a patent list.

The data processing apparatus also has an audio patent list encoder 113 for encoding audio patent list data 107 by a Lampel-Ziv method and for encrypting the encoded data on the basis of audio encrypting key data 108. The Lampel-Ziv method is a method in which, when a sequence of characters is compressed, the existence/absence of the same sequence of characters in a dictionary (a sequence of characters input in the past) is discriminated and, if the corresponding sequence exists, the position and the length of the sequence of characters are replaced by those in the dictionary.

The data processing apparatus also has a video patent list encoder 114 for encoding video patent list data 109 by the same predetermined encoding method as that used for audio and for encrypting the encoded data on the basis of video encrypting key data 110, and a system patent list encoder 115 for encoding system patent list data 111 by the same predetermined encoding method as that used for audio and for encrypting the encoded data on the basis of system encrypting key data 112.

The data processing apparatus also has an IPMP encoder 116 for forming encoded IPMP (intellectual property management and protection) data by multiplexing outputs from the audio patent list encoder 113, the video patent list encoder 114, and the system patent list encoder 115, and by adding header information, etc., to the multiplexed data, and a multiplexer 117 for multiplexing outputs from the audio encoder 104, the video encoder 105, the system encoder 106, and the IPMP encoder 116, and outputs the multiplexed data.

The operation of the data processing apparatus arranged as described above will now be described.

The audio encoder 104 encodes audio data 101 by the MPEG-4 audio encoding system to form encoded audio data. The video encoder 105 encodes video data 102 by the MPEG-4 video encoding system to form encoded video data. The system encoder 106 encodes system data 103 by the BIFS encoding system to form encoded system data.

The video patent list data 109 comprises a list of countries in which patents had been registered and the patent numbers of the patents. This list contains sequences of letters, e.g., DE 1234567, U.S. Pat. No. 1,234,567, FR 1234567, GB 1234567, JP 1234567, JP1234567U . . . . The top two alphabetical letters in each sequence represent the name of a registration country (for example, DE represent Germany, US the United States of America, FR France, GB Great Britain, and JP Japan), and figures following the registration country name represent the patent number or the utility model registration number. For discrimination between patents and utility models, "U" is added to each utility model number after the last figure.

The video patent list encoder 114 encodes video patent list data 109 and encrypts the encoded data by using video encrypting key data 110. Similarly, the audio patent list encoder 113 encodes audio patent list data 107 and encrypts the encoded data by using audio encrypting key data 108. The system patent list encoder 115 encodes system patent list data 111 and encrypts the encoded data by using system encrypting key data 112.

The encrypted data of each kind of patent list data is input to the IPMP encoder 116. The IPMP encoder 116 forms encoded IPMP descriptor data by IPMP encoding in accordance with the MPEG-4 coding system.

Figure 8:
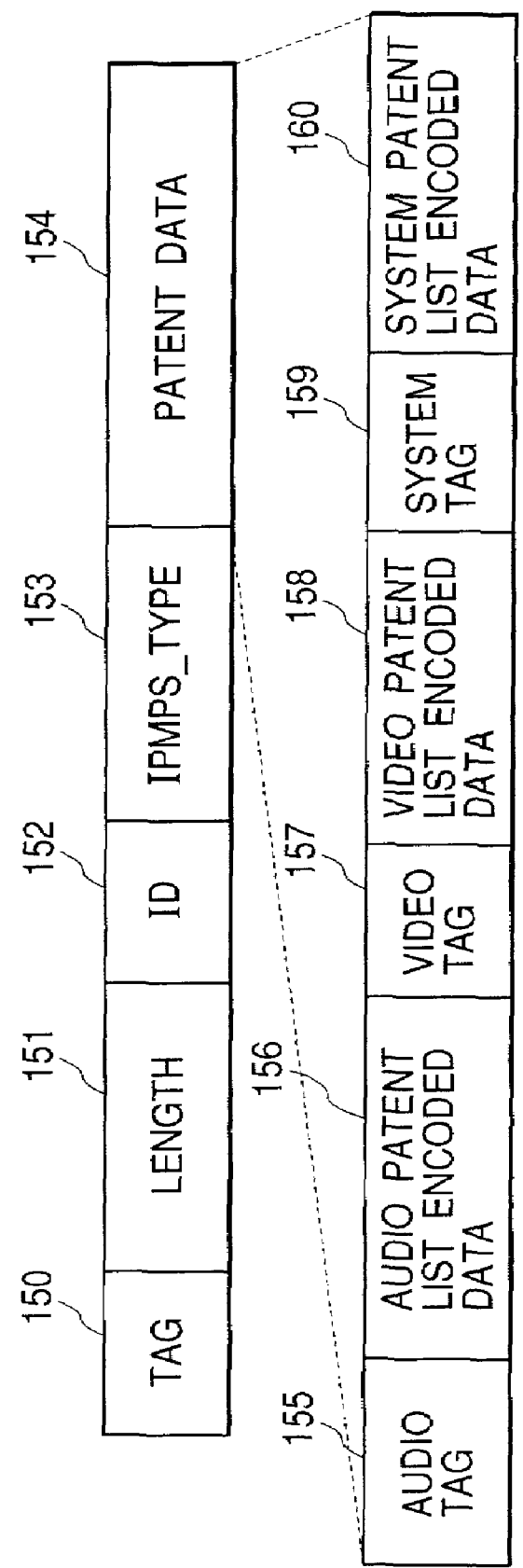
FIG. 8 is a diagram for explaining encoded IPMP data in the embodiment of the present invention.

FIG. 8 shows the data structure of the IPMP descriptor in this embodiment.

Referring to FIG. 8, a descriptor tag 150 is first placed, followed by a length field 151 indicating the length of the entire descriptor. An ID code 152 represents a descriptor ID. Data 153 is IPMPS_Type representing a security type number.

Data 154 is formed by encoding a list of licensed patents and utility models. An audio tag code 155 indicates the existence of encoded data of an audio patent list. Data 156 is audio patent list encoded data obtained by encoding of audio patent list data performed by the audio patent list encoder 113.

A video tag code 157 indicates the existence of encoded data on a video patent list. Data 158 is video patent list encoded data obtained by encoding of video patent list data performed by the video patent list encoder 114.

A system tag code 159 indicates the existence of encoded data of a system patent list. Data 160 is system patent list encoded data obtained by encoding of system patent list data performed by the system patent list encoder 115.

Referring again to FIG. 7 for the description of the operation, the groups of encoded data formed by the audio encoder 104, the video encoder 105, the system encoder 106, and the IPMP encoder 116 are input to the multiplexer 117. These groups of data are ordered in accordance with the MPEG-4 coding format to form a bit stream, which is output to a network (e.g., the Internet) to be transmitted to an external apparatus.

It is possible to easily and orderly arrange, by the above-described selecting process, lists of patents and utility models indispensable for producing contents, and to thereby improve the facility with which intellectual property rights in technological aspects, i.e., patents or the like, are managed and protected.

This embodiment has been described with respect to a case when the MPEG-4 coding system is used. However, the present invention is not limited to this coding system. The Lampel-Ziv method has been described as a patent list data encoding method, but it is not always necessary to use it. For example, patent list data may be embedded in a bit stream without being encoded by compressing coding.

Figure 9:
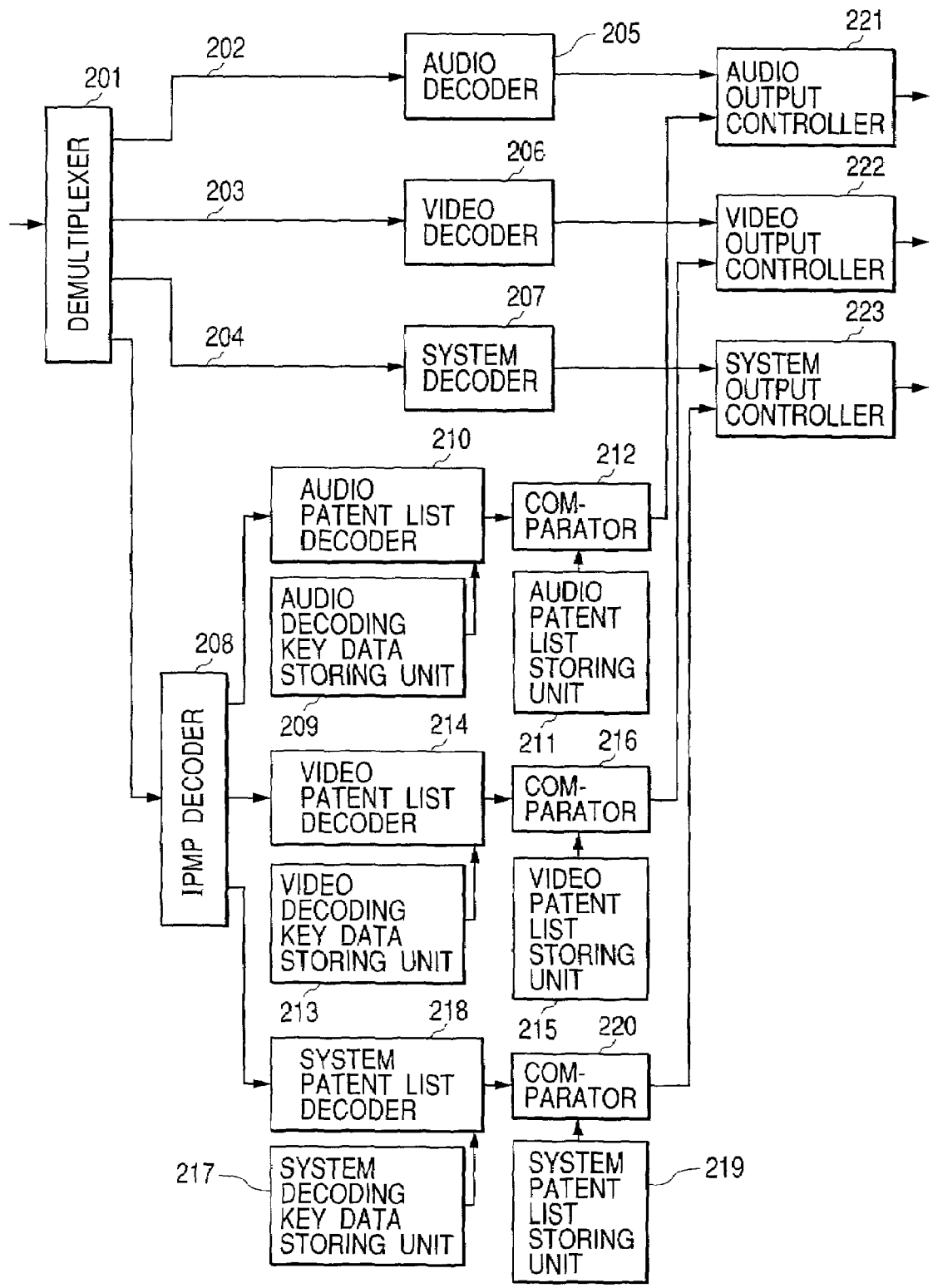
FIG. 9 is a block diagram showing the configuration of a data processing apparatus which represents a second embodiment of the present invention.

FIG. 9 is a block diagram showing the configuration of a data processing apparatus which represents a second embodiment of the present invention. This embodiment relates to processing for decoding and reproducing a bit stream assuming that the bit stream supplied to this data processing apparatus is a bit stream of data encoded by the MPEG-4 encoding process in the first embodiment.

The data processing apparatus of the second embodiment has a demultiplexer 201 which demultiplexes codes by performing processing reverse to that performed by the multiplexer 117 shown in FIG. 7, and which output multiplexed encoded audio data 202, encoded video data 203, encoded system data 204, and encoded IPMP data.

The data processing apparatus has an audio decoder 205 for decoding encoded audio data 202, a video decoder 206 for decoding encoded video data 203, a system decoder 207 for decoding encoded system data 204, and other components described below.

An IPMP decoder 208 is provided to decode encoded IPMP data to separate each kind of encoded data. An audio decrypting key data storing unit 209 is provided in which is stored audio decrypting key data indicating the existence of licenses from the patent licensing corporation and used to decrypt encrypted patent list data. For example, this decrypting key data is provided by the patent licensing corporation.

An audio patent list decoder 210 is provided to decrypt encrypted audio patent list data with the decrypting key stored in the audio decrypting key data storing unit 209, and to decode the decrypted audio patent list data. An audio patent list storing unit 211 is provided in which is stored a list of patents and utility models indispensable for the audio encoding system. This list is information on patent and utility model licenses issued from the patent licensing corporation. A comparator 212 is provided to compare an output from the audio patent list decoder 210 and the patent list stored in the audio patent list storing unit 211.

A video decrypting key data storing unit 213 is provided in which is stored video decrypting key data indicating the existence of licenses from the patent licensing corporation and used to decrypt encrypted patent list data.

A video patent list decoder 214 is provided to decrypt encrypted video patent list data with the decrypting key stored in the video decrypting key data storing unit 213, and to decode the decrypted video patent list data. A video patent list storing unit 215 is provided in which is stored a list of patents and utility models indispensable for the video encoding system. This list contains information on patent and utility model licenses issued from the patent licensing corporation. A comparator 216 is provided to compare an output from the video patent list decoder 214 and the patent list stored in the video patent list storing unit 215.

A system decrypting key data storing unit 217 is provided in which is stored system decrypting key data indicating the existence of licenses from the patent licensing corporation and used to decrypt encrypted patent list data.

A system patent list decoder 218 is provided to decrypt encrypted system patent list data with the decrypting key stored in the system decrypting key data storing unit 217, and to decode the decrypted system patent list data. A system patent list storing unit 219 is provided in which is stored a list of patents and utility models indispensable for the system encoding system. This list contains information on patent and utility model licenses issued from the patent licensing corporation. A comparator 220 is provided to compare an output from the system patent list decoder 218 and the patent list stored in the system patent list storing unit 219.

An audio output controller 221 is provided to control the output of the audio decoder according to the output from the comparator 212. A video output controller 222 is provided to control the output of the video decoder according to the output from the comparator 216. A system output controller 223 is provided to control the output of the system decoder according to the output from the comparator 220.

The operation of the thus-arranged data processing apparatus will be described.

The demultiplexer 201 is supplied with the bit stream of MPEG-4 encoded data formed in the first embodiment, and demultiplexes it into groups of encoded data. That is, the demultiplexer 201 demultiplexes, from the input bit stream, encoded audio data 202, encoded video data 203, encoded system data 204, and encoded IPMP data, and inputs encoded audio data 202 to the audio decoder 205, encoded video data 203 to the video decoder 206, encoded system data 204 to the system decoder 207, and encoded IPMP data to the IPMP decoder 208.

The audio decoder 205 decodes encoded audio data 202 to reproduce audio data, and inputs the audio data to the audio output controller 221. The video decoder 206 decodes encoded video data 203 to reproduce video data, and inputs the video data to the video output controller 222. The system decoder 207 decodes encoded system data 204 to reproduce system data, and inputs the system data to the system output controller 223.

On the other hand, the IPMP decoder 208 decodes encoded IPMP descriptor data on the basis of IPMP coding in accordance with the MPEG-4 coding system. The IPMP decoder 208 interprets descriptor tag 150 from the IPMP descriptor shown in FIG. 8 referred to in the description of the first embodiment, and determines the length of the descriptor from length field 151. The IPMP decoder 208 decodes descriptor ID 152 and IPMPS_Type 153 and obtains information including the security type number.

Further, the IPMP decoder 208 recognizes audio tag code 155 and outputs encoded audio patent list data 156 to the audio patent list decoder 210. Subsequently, the IPMP decoder 208 recognizes video tag code 157, outputs encoded video patent list data 158 to the video patent list decoder 214, recognizes system tag code 159, and outputs encoded system patent list data 160 to the system patent list decoder 218.

The audio patent list decoder 210 decrypts the data by using the audio decrypting key data stored in the audio decrypting key data storing unit 209. This audio decrypting key data is a key in a public-key crypto system paired with audio encrypting key data 108 provided in the first embodiment as shown in FIG. 7. Therefore, the audio patent list decoder 210 cannot correctly perform decryption unless an audio decrypting key corresponding to the audio encrypting key data 108 is provided from the patent licensing corporation.

Thereafter, the audio patent list decoder 210 decodes the decrypted data to reproduce the audio patent list, and inputs the reproduced audio patent list to the comparator 212. The comparator 212 compares the patent list from the audio patent list decoder 210 with the patent list stored in the audio patent list storing unit 211 and containing information on the patents indispensable for the audio coding system.

If the result of comparison by the comparator 212 is "identical" or that the audio patent list stored in the audio patent list storing unit 211 includes the patent list output from the audio patent list decoder 210, it is confirmed that the contents producing encoder and the contents reproducing decoder are under the genuine licenses from the patent licensing corporation. The audio output controller 221, informed of this result, allows the output from the audio decoder 205 to be output from the data processing apparatus.

If the audio patent list decoder 210 fails to correctly perform decryption, or if an item which is not contained in the patent list stored in the audio patent list storing unit 211 exists in the patent list from the audio patent list decoder 210, then the audio output controller 221 does not allow the output from the audio decoder 205 to be output from the data processing apparatus.

Similarly, the video patent list decoder 214 decrypts the data by using the decrypting key stored in the video decrypting key data storing unit 213, and decodes the decrypted data to reproduce the video patent list. The comparator 216 compares the patent list from the video patent list decoder 214 with the patent list stored in the video patent list storing unit 215 and containing information on the patents indispensable for the video coding system.

If the result of comparison by the comparator 216 is "identical" or that the video patent list stored in the video patent list storing unit 215 includes the patent list output from the video patent list decoder 214, it is confirmed that the contents producing encoder and the contents reproducing decoder are under the genuine licenses from the patent licensing corporation. The video output controller 222, informed of this result, allows the output from the video decoder 206 to be output from the data processing apparatus.

If the video patent list decoder 214 fails to correctly perform decryption, or if an item which is not contained in the patent list stored in the video patent list storing unit 215 exists in the patent list from the video patent list decoder 214, then the video output controller 222 does not allow the output from the video decoder 206 to be output from the data processing apparatus.

Similarly, the system patent list decoder 218 decrypts the data by using the decrypting key stored in the system decrypting key data storing unit 217, and decodes the decrypted data to reproduce the system patent list. The comparator 220 compares the patent list from the system patent list decoder 218 with the patent list stored in the system patent list storing unit 219 and containing information on the patents indispensable for the system coding system.

If the result of comparison by the comparator 220 is "identical" or that the system patent list stored in the system patent list storing unit 219 includes the patent list output from the system patent list decoder 218, it is confirmed that the contents producing encoder and the contents reproducing decoder are under the genuine licenses from the patent licensing corporation. The system output controller 223, informed of this result, allows the output from the system decoder 207 to be output from the data processing apparatus.

If the system patent list decoder 218 fails to correctly perform decryption, or if an item which is not contained in the patent list stored in the system patent list storing unit 219 exists in the patent list from the system patent list decoder 218, then the system output controller 223 does not allow the output from the system decoder 207 to be output from the data processing apparatus.

It is possible to easily discrimination, by the above-described selecting process, the existence of licenses with respect to intellectual property rights in technological aspects (e.g., patent rights and utility model rights) necessary for producing or reproducing contents. Reproduction can be controlled according to the result of discriminating. Thus, it is possible to improve the facility with which intellectual property rights in technological aspects, i.e., patents or the like, are managed and protected.

Figure 10:
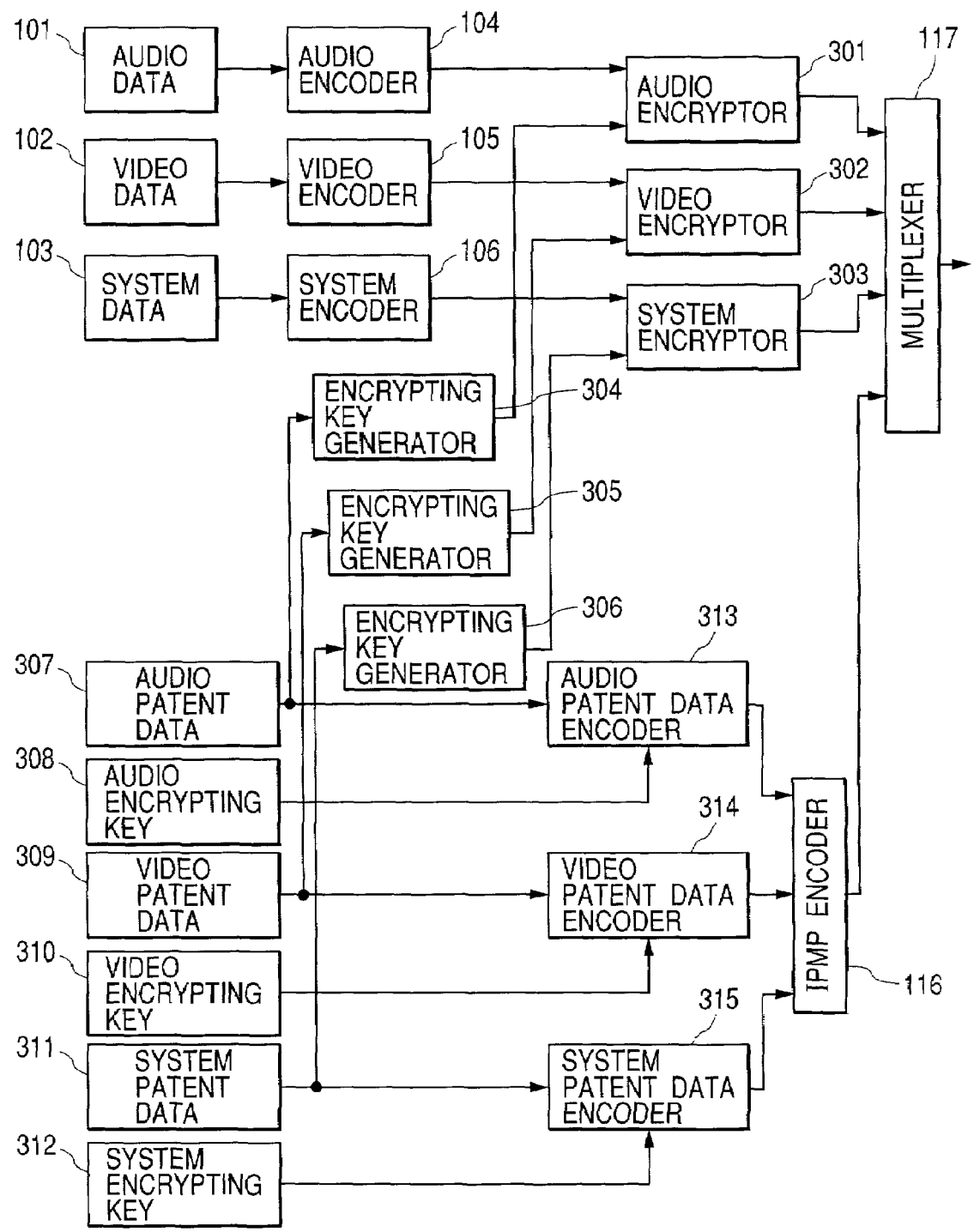
FIG. 10 is a block diagram showing the configuration of a data processing apparatus which represents a third embodiment of the present invention.

FIG. 10 is a block diagram showing the configuration of a data processing apparatus which represents a third embodiment of the present invention. Components of this embodiment identical or corresponding to those of the first embodiment are indicated by the same reference numerals and will not be described in detail.

Referring to FIG. 10, the data processing apparatus has an audio encryptor 301 for encrypting encoded audio data by using an audio encrypting key generated by an encrypting key generator 304, a video encryptor 302 for encrypting encoded video data by using a video encrypting key generated by using an encrypting key generator 305, and a system encryptor 303 for encrypting encoded system data by a system encrypting key generated by an encrypting key generator 306.

The encrypting key generator 304 is provided to generate a key for encrypting encoded audio data from a sequence of characters in an audio patent list. For this key generation, a known method, not described below, may be used. The encrypting key generators 305 and 306 are also provided to generate encrypting keys from a video patent list and a system patent list, respectively.

Data 307 of patents and utility models indispensable for the audio encoding system is supplied. This data comprises information on patent licenses issued from the patent licensing corporation. An audio encrypting key 308 is supplied which indicates the existence of licenses from the patent licensing corporation, and which is used to encrypt a patent list.

Data 309 of patents and utility models indispensable for the video encoding system and licensed by the patent licensing corporation is supplied. A video encrypting key 310 is supplied which indicates the existence of licenses from the patent licensing corporation, and which is used to encrypt a patent list.

Data 311 of patents and utility models indispensable for the BIFS encoding system and licensed by the patent licensing corporation is supplied. A system encrypting key 312 is supplied which indicates the existence of licenses from the patent licensing corporation, and which is used to encrypt a patent list.

An audio patent data encoder 313 is provided to encode audio patent data 307 by the Lampel-Ziv method and to encrypt the encoded data by using audio encrypting key 308. A video patent data encoder 314 is provided to encode video patent data 309 and to encrypt the encoded data by using video encrypting key 310. A system video patent data encoder 315 is provided to encode system patent data 311 and to encrypt the encoded data by using system encrypting key 312.

The operation of the thus-arranged data processing apparatus will be described.

First, the audio encoder 104 forms encoded audio data, the video encoder 105 forms encoded video data, and the system encoder 106 forms encoded system data, as in the first embodiments.

The contents of video patent data 309 are names of enterprises, organizations and individuals holding patents and utility models necessary for decoding encoded video data, e.g., Canon Inc. . . . .

The video patent data encoder 314 encodes video patent data 309 by the Lampel-Ziv method or the like, and encrypts the encoded data by using video encrypting key 310.

Similarly, the audio patent data encoder 313 encodes audio patent data 307 and encrypts the encoded data by using audio encrypting key 308. The system patent data encoder 315 encodes system patent data 311 and encrypts the encoded data by using system encrypting key 312.

Each kind of patent encoded data thus encrypted is input to the IPMP encoder 116. The IPMP encoder 116 produces encoded IPMP descriptor data by IPMP encoding in accordance with the MPEG-4 coding system.

Audio patent data 307, video patent data 309, system patent data 311 are respectively input to the encrypting key generators 304, 305, and 306, which generate encrypting keys by the above-described method.

The encrypting key generated by the encrypting key generator 304 is input to the audio encryptor 301. The audio encryptor 301 encrypts the output from the audio encoder 104 and outputs the encrypted data to the multiplexer 117.

The encrypting key generated by the encrypting key generator 305 is input to the video encryptor 302. The video encryptor 302 encrypts the output from the video encoder 105 and outputs the encrypted data to the multiplexer 117.

The encrypting key generated by the encrypting key generator 306 is input to the system encryptor 303. The system encryptor 303 encrypts the output from the system encoder 106 and outputs the encrypted data to the multiplexer 117.

The multiplexer 117 forms a bit stream in accordance with the MPEG-4 coding system from the groups of encrypted data input from the audio encryptor 301, the video encryptor 302, system encryptor 303, and the IPMP encoder 116, and outputs the bit stream.

It is possible to easily and orderly arrange, by the above-described selecting process, information on patents and utility models necessary for reproducing contents, and to thereby improve the facility with which intellectual property rights in technological aspects, i.e., patents or the like, are managed and protected.

The present embodiment has been described with respect to a case in which the MPEG-4 coding system is used. However, the present invention is not limited to this coding system. The Lampel-Ziv method has been described as a patent data encoding method, but it is not always necessary to use it. For example, patent data may be embedded in a bit stream without being encoded.

Figure 11:
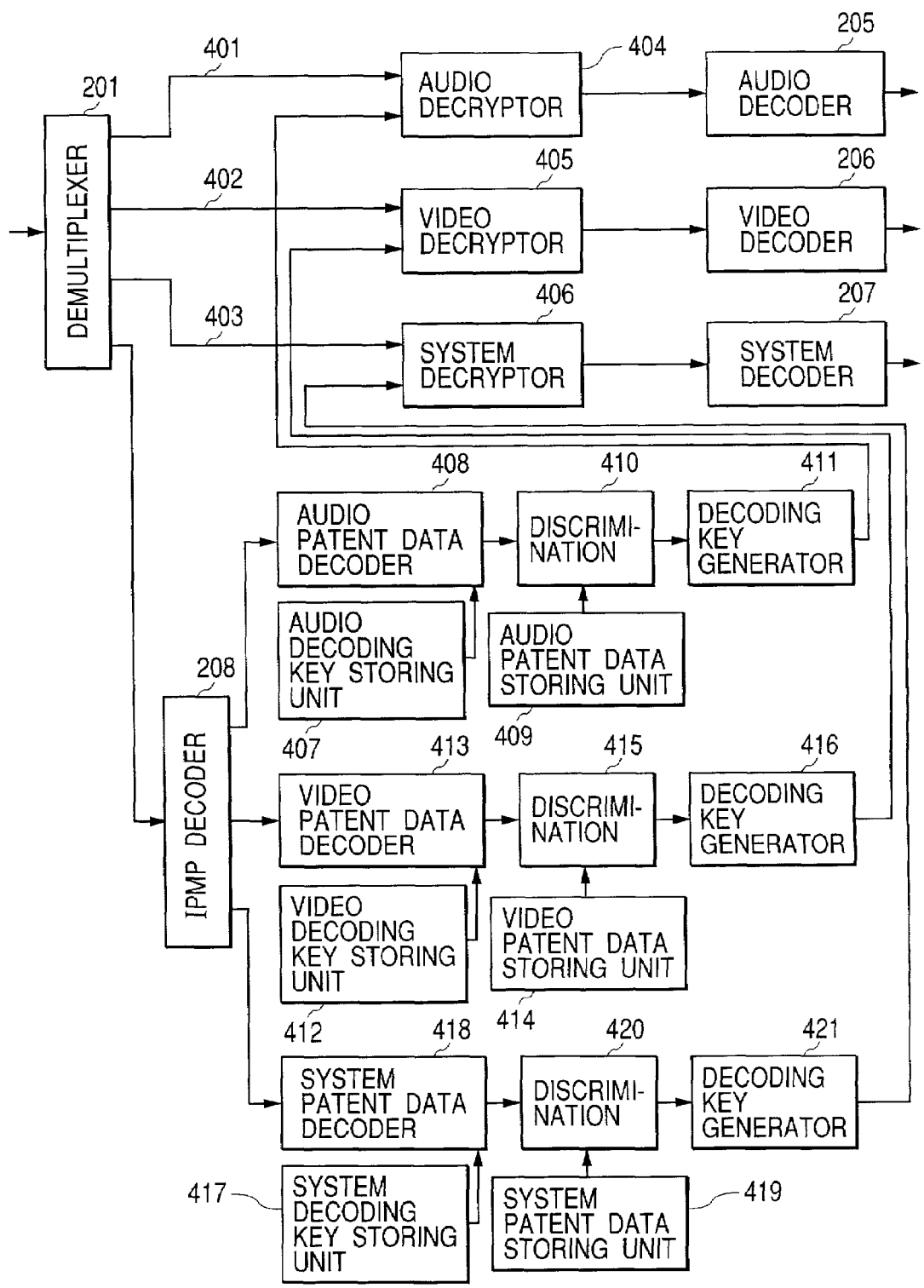
FIG. 11 is a block diagram showing the configuration of a data processing apparatus which represents a fourth embodiment of the present invention.

FIG. 11 is a block diagram showing the configuration of a data processing apparatus which represents a fourth embodiment of the present invention. Components of this embodiment identical or corresponding to those of the second embodiment are indicated by the same reference numerals and will not be described in detail.

Referring to FIG. 11, encrypted audio data 401, encrypted video data 402, and encrypted system data 403 are demultiplexed by a demultiplexer 201. The data processing apparatus has an audio decryptor 404 for decrypting encrypted audio data 401, a video decryptor 405 for decrypting encrypted video data 402, and a system decryptor 406 for decrypting encrypted system data 403.

An audio decrypting key storing unit 407 is provided in which is stored an audio decrypting key indicating the existence of patent or utility model licenses from the patent licensing corporation and used to decrypt encrypted audio patent data. For example, this decrypting key data is provided by the patent licensing corporation.

An audio patent data decoder 408 is provided to decrypt encrypted audio patent data with the decrypting key stored in the audio decrypting key data storing unit 407, and to decode the decrypted audio patent data.

An audio patent data storing unit 409 is provided in which is stored audio patent data comprising information on enterprises, organizations and individuals holding patents and utility models managed by the patent licensing corporation and indispensable for the audio coding system. A discriminator 410 is provided to discrimination the validity of the output from the audio patent data decoder 408 by comparing this output with the audio patent data stored in the audio patent data storing unit 409. A decrypting key generator 411 is provided to generate from the output from the audio patent data decoder 408 a decrypting key for decrypting encrypted audio data when the discriminator 410 determines that the discriminated patent data is valid.

A video decrypting key storing unit 412 is provided in which is stored a video decrypting key indicating the existence of patent or utility model licenses from the patent licensing corporation and used to decrypt encrypted video patent data. A video patent data decoder 413 is provided to decrypt encrypted video patent data with the decrypting key stored in the video decrypting key data storing unit 412, and to decode the decrypted video patent data.

A video patent data storing unit 414 is provided in which is stored video patent data comprising information on enterprises, organizations and individuals holding patents and utility models managed by the patent licensing corporation and indispensable for the video coding system. A discriminator 415 is provided to discrimination the validity of the output from the video patent data decoder 413 by comparing this output with the video patent data stored in the video patent data storing unit 414. A decrypting key generator 416 is provided to generate from the output from the video patent data decoder 413 a decrypting key for decrypting encrypted video data when the discriminator 415 determines that the discriminated patent data is valid.

A system decrypting key storing unit 417 is provided in which is stored a system decrypting key indicating the existence of patent or utility model licenses from the patent licensing corporation and used to decrypt encrypted system patent data. A system patent data decoder 418 is provided to decrypt encrypted system patent data with the decrypting key stored in the system decrypting key data storing unit 417, and to decode the decrypted system patent data.

A system patent data storing unit 419 is provided in which is stored system patent data comprising information on enterprises, organizations and individuals holding patents and utility models managed by the patent licensing corporation and indispensable for the BIFS coding system. A discriminator 420 is provided to discrimination the validity of the output from the system patent data decoder 418 by comparing this output with the system patent data stored in the system patent data storing unit 419. A decrypting key generator 421 is provided to generate from the output from the system patent data decoder 418 a decrypting key for decrypting encrypted system data when the discriminator 420 determines that the discriminated patent data is valid.

The operation of the thus-arranged data processing apparatus will be described.

First, the demultiplexer 201 is supplied with the bit stream of MPEG-4 encoded data formed in the third embodiment and demultiplexes it into groups of encoded data, as in the second embodiment. That is, the demultiplexer 201 demultiplexes, from the bit stream, encrypted audio data 401, encrypted video data 402, encrypted system data 403, and encoded IPMP data.

Demultiplexed encrypted audio data 401 is input to the audio decryptor 404, encrypted video data 402 to the video decryptor 405, encoded system data 403 to the system decryptor 406, and encoded IPMP data to the IPMP decoder 208.

The IPMP decoder 208 decodes encoded IPMP descriptor data on the basis of IPMP coding in accordance with the MPEG-4 coding system, as in the second embodiment. The IPMP decoder 208 outputs encoded audio patent data 156 (see FIG. 8) to the audio patent data decoder 408, outputs encoded video patent list data 158 to the video patent data decoder 413 by recognizing video tag code 157, and outputs system patent list data 160 to the system patent data decoder 418 by recognizing system tag code 159.

The audio patent data decoder 408 decrypts the data with the decrypting key stored in the audio decrypting key storing unit 407, decodes the decrypted data to reproduce audio patent data, and input this data to the discriminator 410.

The discriminator 410 compares the audio patent data decoded by the patent audio decoder 408 and the audio patent data stored in the patent data storing unit 409.

If the discriminator 410 determines that the two groups of data coincide with each other or the audio patent data stored in the audio patent data storing unit 409 includes the audio patent data from the audio patent data decoder 408, then it confirms that the encoder in the contents producing apparatus and the decoder in the contents reproducing apparatus are under the genuine licenses from the patent licensing corporation. Upon confirming this, the discriminator 410 supplies the output from the audio patent data decoder 408 to the decrypting key generator 411.

If the audio patent data decoder 408 fails to correctly perform decryption, or if an item which is not contained in the audio patent data stored in the audio patent data storing unit 409 exists in the output from the audio patent data decoder 408, then the discriminator 410 supplies no data to the decrypting key generator 411. In this case, the decrypting key generator 411 outputs a value irrelevant to the decrypting key, e.g., "0".

Similarly, the video patent data decoder 413 decrypts the data with the decrypting key stored in the video decrypting key storing unit 412, decodes the decrypted data to reproduce video patent data, and input this data to the discriminator 415.

The discriminator 415 compares the video patent data decoded by the patent video decoder 413 and the video patent data stored in the patent data storing unit 414.

If the discriminator 415 determines that the two groups of data coincide with each other or the video patent data stored in the video patent data storing unit 414 includes the video patent data from the video patent data decoder 413, then it confirms that the encoder in the contents producing apparatus and the decoder in the contents reproducing apparatus are under the genuine licenses from the patent licensing corporation. Upon confirming this, the discriminator 415 supplies the output from the video patent data decoder 413 to the decrypting key generator 416.

If the video patent data decoder 413 fails to correctly perform decryption, or if an item which is not contained in the video patent data stored in the video patent data storing unit 414 exists in the output from the video patent data decoder 413, then the discriminator 415 supplies no data to the decrypting key generator 416. In this case, the decrypting key generator 416 outputs a value irrelevant to the decrypting key, e.g., "0".

Similarly, the system patent data decoder 418 decrypts the data with the decrypting key stored in the system decrypting key storing unit 417, decodes the decrypted data to reproduce system patent data, and input this data to the discriminator 420.

The discriminator 420 compares the system patent data decoded by the patent system decoder 418 and the system patent data stored in the patent data storing unit 419.

If the discriminator 420 determines that the two groups of data coincide with each other or the system patent data stored in the system patent data storing unit 419 includes the system patent data from the system patent data decoder 418, then it confirms that the encoder in the contents producing apparatus and the decoder in the contents reproducing apparatus are under the genuine licenses from the patent licensing corporation. Upon confirming this, the discriminator 420 supplies the output from the system patent data decoder 418 to the decrypting key generator 421.

If the system patent data decoder 418 fails to correctly perform decryption, or if an item which is not contained in the system patent data stored in the system patent data storing unit 419 exists in the output from the system patent data decoder 418, then the discriminator 420 supplies no data to the decrypting key generator 421. In this case, the decrypting key generator 421 outputs a value irrelevant to the decrypting key, e.g., "0".

The keys for decryption generated by the decrypting key generators 411, 416, and 421 are supplied to the audio decryptor 404, the video decryptor 405, and the system decryptor 406, respectively. Each decryptor decrypts the encrypted data with the supplied decrypting key. If at this time a correct decrypting key is not supplied, decryption processing is performed incorrectly and correct encoded data cannot be obtained. The results of decryption from the decryptors are respectively supplied to the audio decoder 205, the video decoder 206, and the system decoder 207.

The audio decoder 205, the video decoder 206, and the system decoder 207 respectively decode the encoded data to reproduce audio data, video data and system data, as in the second embodiment. While correct data is obtained from correct encoded data, incorrect encoded data is not correctly decoded and no reproduction output results therefrom.

It is possible to easily discriminate, by the above-described selecting process, whether intellectual property rights in technological aspects (e.g., patents and utility models) necessary for producing or reproducing contents have been licensed. Reproduction can be controlled according to the result of discrimination. Thus, it is possible to improve the facility with which intellectual property rights in technological aspects, i.e., patents or the like, are managed and protected.

Figure 12:
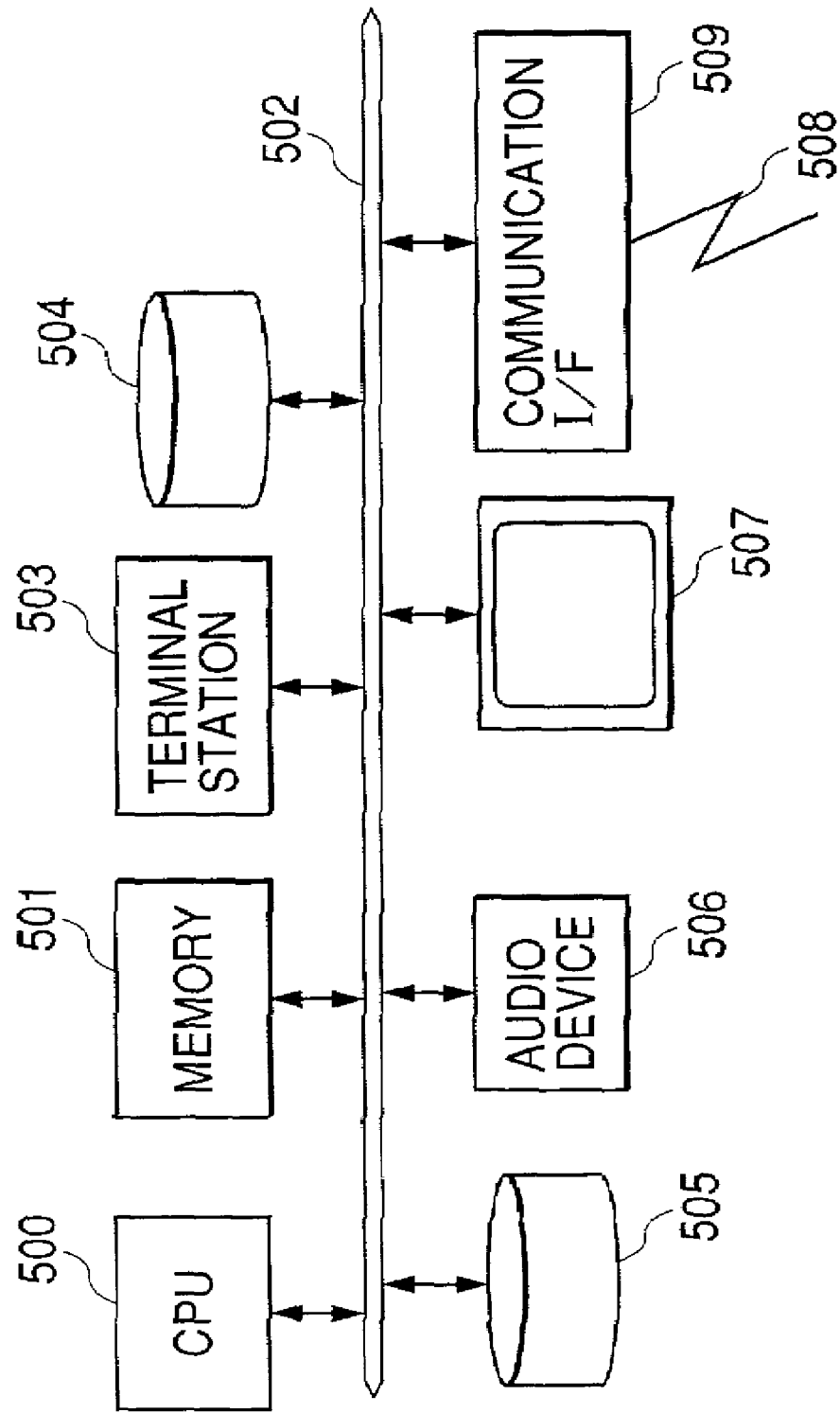
FIG. 12 is a block diagram showing the configuration of a data processing apparatus which represents a fifth embodiment of the present invention.

FIG. 12 is a block diagram showing the configuration of a data processing apparatus which represents a fifth embodiment of the present invention.

Referring to FIG. 12, the data processing apparatus has a central processing unit (CPU) 500 which performs overall control of the apparatus as well as various kinds of processing, and a memory 501 which provides storage spaces required to load or execute an operating system (OS), software and calculations necessary for control of this apparatus.

A bus 502 connects various devices and enables sending and receiving of data control signals. A terminal station 503 is used, for example, to start up the apparatus, and to set various conditions including the bit rate. A storage device 504 stores software.

A storage device 505 is provided to store data for producing contents and produced contents. An audio device 506 is provided to reproduce audio data and to output sound. A monitor 507 is provided to display images. A communication line 508 is formed as a local area network (LAN), a telephone line, a wireless communication channel, an electric wave broadcasting channel, or the like. A communication interface 509 is connected to the communication line 508 to transmit encoded data.

In the storage device 504, software such as shown in FIG. 12 is stored. That is, a system encoding program for performing system encoding of system data, a video encoding program for performing video encoding of video program, an audio encoding program for performing encoding of audio data, an encrypting program for encryption are stored.

In the storage device 504 are further stored system patent code indicating patents and utility models indispensable for the system encoding system using the system encoding program, video patent code indicating patents and utility models indispensable for the video encoding system using the video encoding program, audio patent code indicating patents and utility models indispensable for the audio encoding system using the audio encoding program, an IPMP encoding program for forming encoded IPMP data, a multiplexing program for multiplexing encoded data to form a bit stream, and a communication program for controlling the communication interface 509.

The above-mentioned audio patent code, video patent code and system patent code are codes for indicating patents and utility models managed by a patent licensing corporation.

The memory 501 stores the OS for performing overall control of the apparatus and for operating various kinds of software, and software to be executed, and has an image area to which image data is read for encoding, a code area for temporarily storing code data, a data area for temporarily storing contents data, and a working area for storing parameters, etc., for various calculations.

The operation of the thus-arranged data processing apparatus will be described.

First, before processing, moving image data to be encoded is selected from moving image data stored in the storage device 504 through the terminal station 503, and an instruction is given to start up the data processing apparatus. Necessary software stored in the storage device 504 is then loaded on the memory 501 through the bus 502 and started.

The operation will be described with reference to the flowchart shown in FIG. 14 with respect to a process in which system data, video data and audio data stored in the storage device 504 are encoded by the CPU 500 to form contents.

Figure 14:
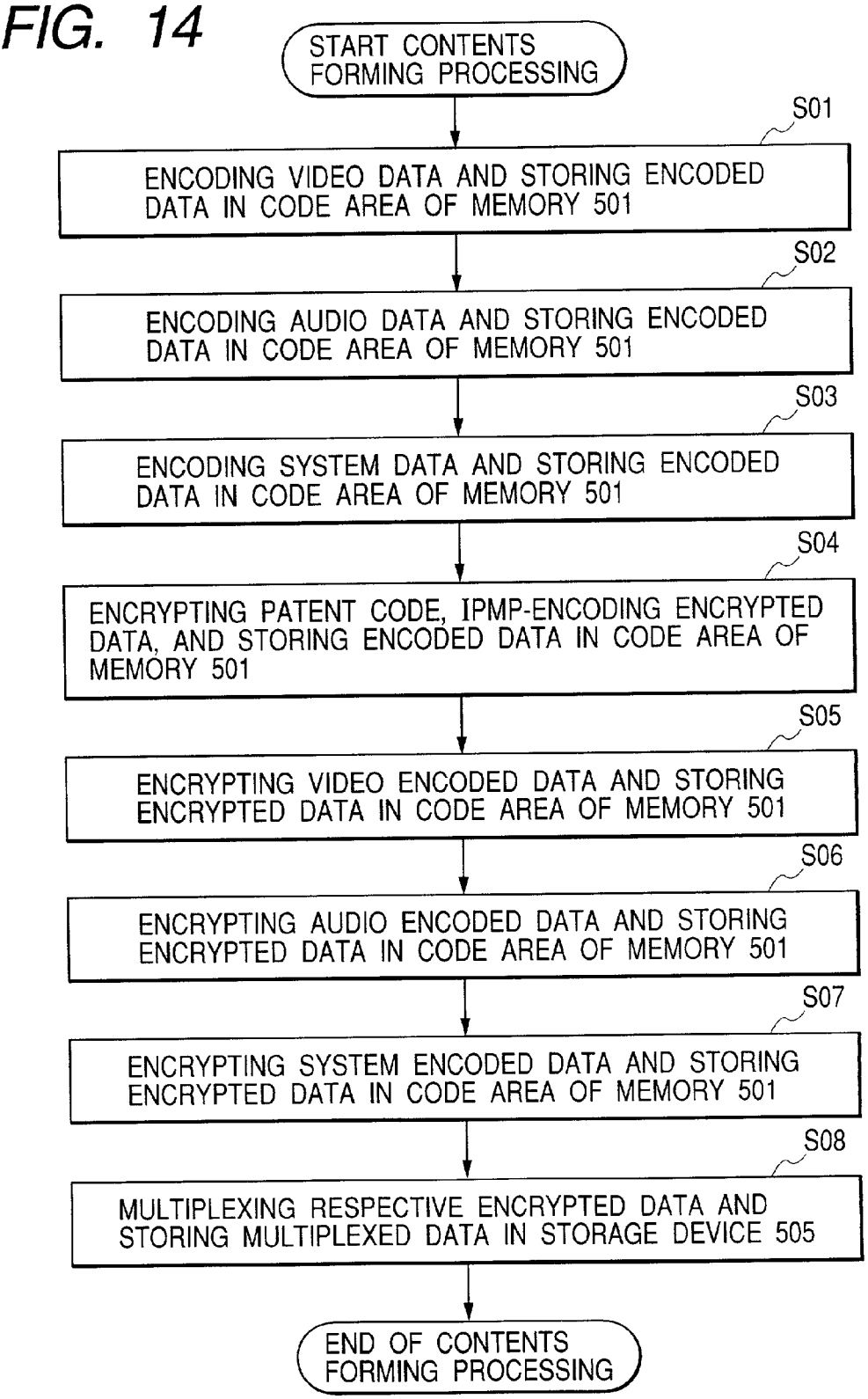
FIG. 14 is a flowchart for explaining the operation in the fifth embodiment of the present invention with respect to a content forming process.

Referring to FIG. 14, in step S01, the video encoding program stored in the storage device 504 is loaded on the memory 501, and video data selected by the terminal station 503 is read out from the storage device 505, encoded and stored in the code area of the memory 501, and the procedure advances to step S02.

In step S02, the audio encoding program stored in the storage device 504 is loaded on the memory 501, and audio data selected by the terminal station 503 is read out from the storage device 505, encoded and stored in the code area of the memory 501, and the procedure advances to step S03.

In step S03, the system encoding program stored in the storage device 504 is loaded on the memory 501, and system data selected by the terminal station 503 is read out from the storage device 505, encoded and stored in the code area of the memory 501 , and the procedure advances to step S04.

In step S04, the encrypting program stored in the storage device 504 is loaded on the memory 501, video patent code, audio patent code and system patent code are read out from the storage device 504, respectively encrypted, and encoded by IPMP coding in accordance with the MPEG-4 coding system to form encoded data of IPMP descriptors.

Figure 15:
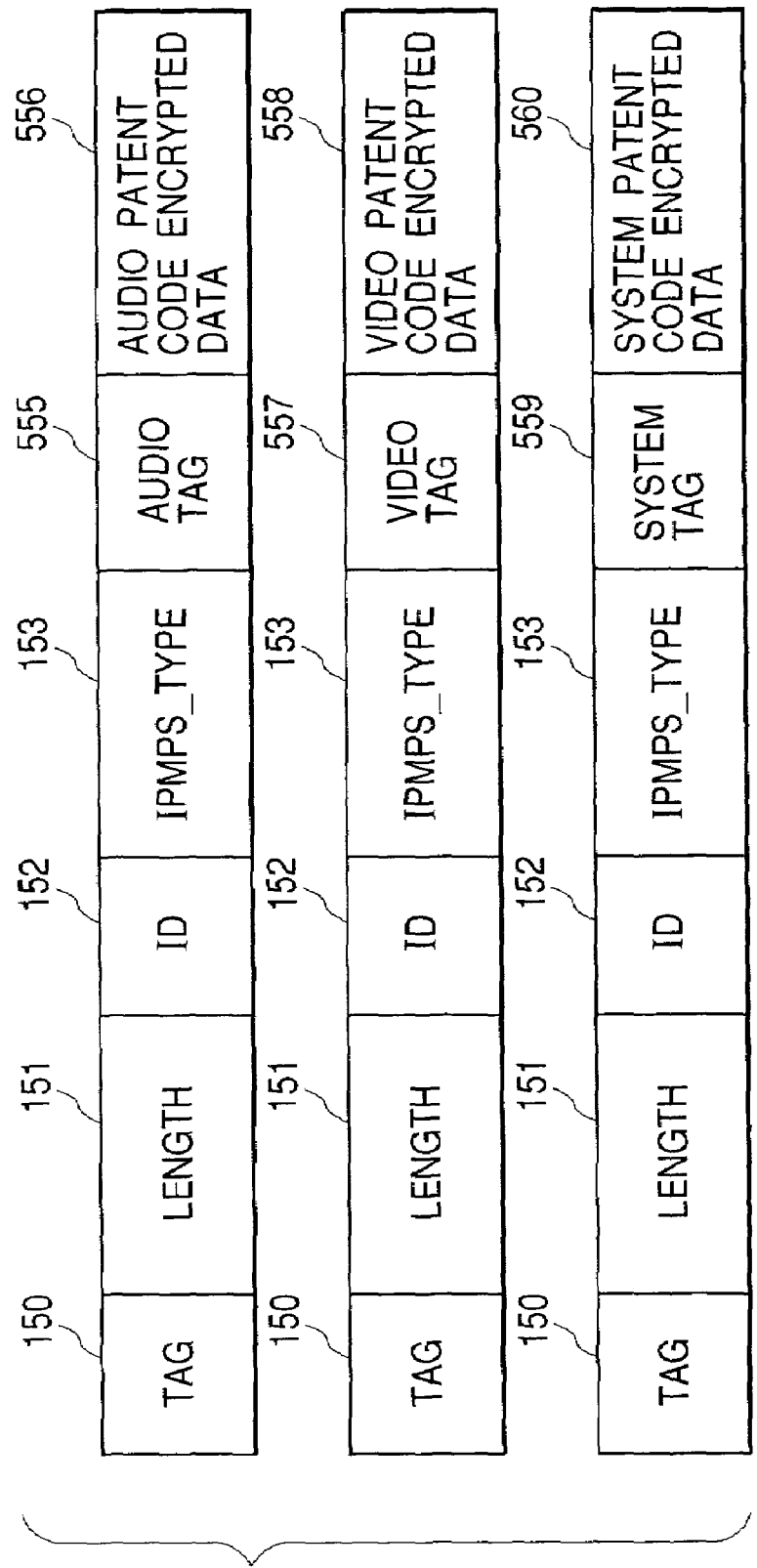
FIG. 15 is a diagram for explaining encoded IPMP data in the embodiment of the present invention.

FIG. 15 shows formed IPMP descriptors. The same components as those shown in FIG. 8 referred in the description for the second embodiment are indicated by the same reference numerals, and the description for them will not be repeated.

Referring to FIG. 15, an audio tag code 555 indicating the existence of audio patent code, and audio patent code encrypted data 556 formed by encrypting audio patent code are provided.

A video tag code 557 indicating the existence of video patent code, and video patent code encrypted data 558 formed by encrypting video patent code are provided. A system tag code 559 indicating the existence of system patent code, and system patent code encrypted data 560 formed by encrypting system patent code are provided.

Encoded data of the above-described IPMP descriptor is stored in the code area of the memory 501, and the procedure advances to step S05.

In step S05, encoded video data encoded and stored in the code area of the memory 501 in step S01 is encrypted and the obtained encrypted video data is stored in the code area of the memory 501. Then the procedure advances to step S06.

In step S06, encoded audio data encoded and stored in the code area of the memory 501 in step S02 is encrypted and the obtained encrypted audio data is stored in the code area of the memory 501. Then the procedure advances to step S07.

In step S07, encoded system data encoded and stored in the code area of the memory 501 in step S03 is encrypted and the obtained encrypted system data is stored in the code area of the memory 501. Then the procedure advances to step S08.

In step S08, the multiplexing program stored in the storage device 504 is loaded on the memory 501, the encrypted audio data, encrypted video data, and encrypted system data and encoded data of the IPMP descriptor stored in the code area of the memory 501 are multiplexed and stored in a predetermined area of the storage device 505, thereby completing the procedure.

If necessary, the CPU 500 starts the communication program stored in the storage device 504 to send out contents in the storage device 505 to an external terminal station over the communication line 508.

It is possible to easily and orderly arrange, by the above-described selecting procedure, lists of patents and utility models indispensable for producing contents, and to thereby improve the facility with which intellectual property rights in technological aspects, i.e., patents or the like, are managed and protected.

Contents formed and stored in storage device 505 by the CPU 500 in the fifth embodiment of the present invention are decoded and reproduced by a data processing apparatus based on the arrangement shown in FIG. 12 as the sixth embodiment of the present invention.

In this embodiment, software such as shown in FIG. 16 is stored in the storage device 504 shown in FIG. 12. That is, a system decoding program for decoding encoded system data, a video decoding program for decoding encoded video data, an audio decoding program for decoding encoded audio data, and a decrypting program for decrypting encrypted data are stored.

Further, system patent code indicating patents and utility models indispensable for the system coding system using the system decoding program, video patent code indicating patents and utility models indispensable for the video coding system using the video decoding program, and audio patent code indicating patents and utility models indispensable for the audio coding system using the audio decoding program are stored.

Still further, an IPMP decoding program for decoding encoded IPMP data, a demultiplexing program for demultiplexing each kind of data from a multiplexed bit stream, a contents execution program for reproducing and outputting reproduced contents through audio device 506 and monitor 507, and a communication program for controlling communication interface 509 are stored.

The above-mentioned audio patent code, video patent code and system patent code are codes for indicating patents and utility models managed by a patent licensing corporation.

The operation of the thus-arranged data processing apparatus will be described.

First, prior to processing, some of contents stored in the storage device 504 are selected by the terminal station 503, and an instruction is given to start up the data processing apparatus. Software stored in the storage device 504 is then loaded on the memory 501 through the bus 502 according to the instruction and started.

The operation will be described with reference to the flowcharts shown in FIGS. 17 and 18 with respect to a process in which system data, video data and audio data stored in the storage device 504 are decoded by the CPU 500 to reproduce contents.

Figure 17:
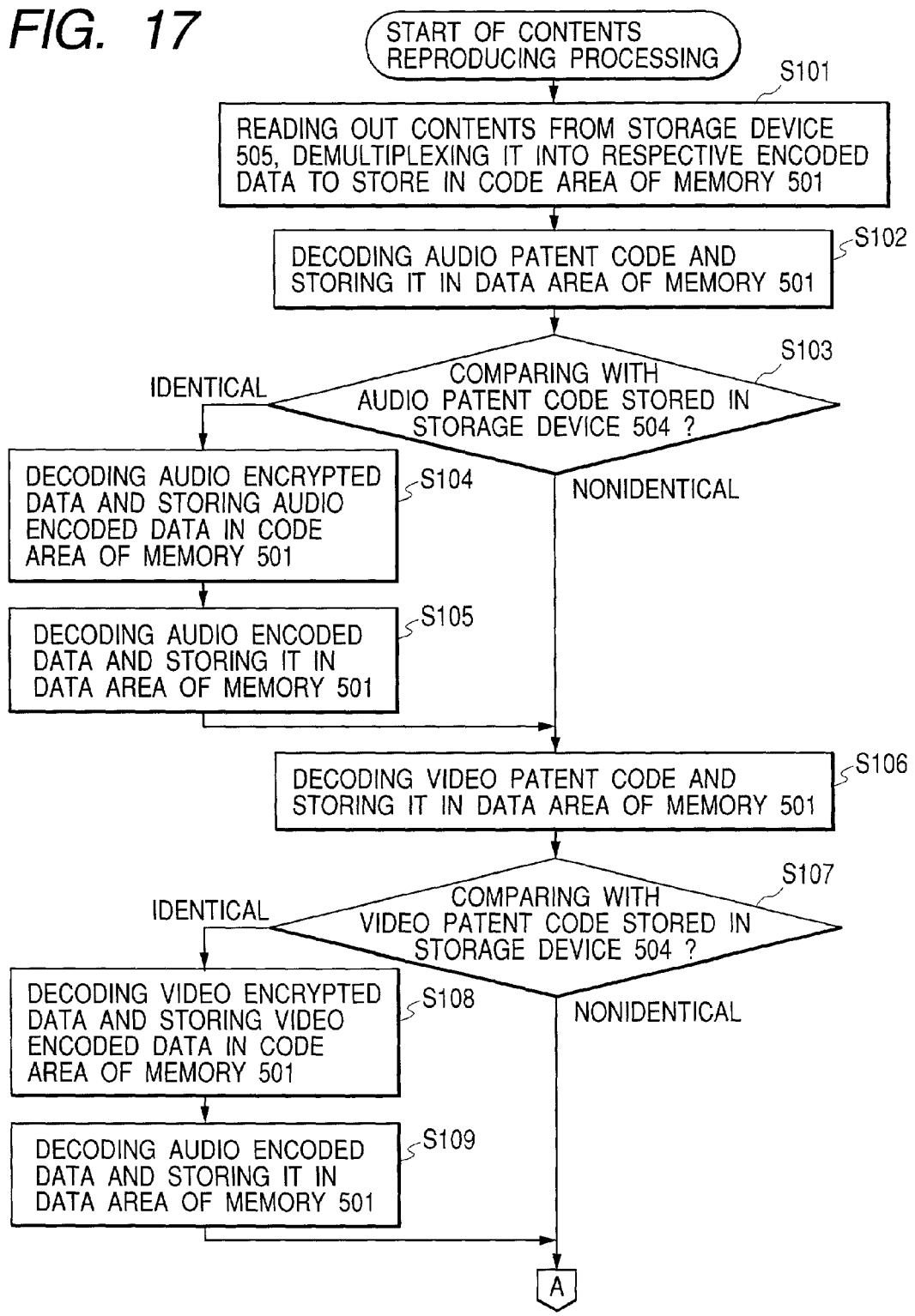
FIG. 17 is a flowchart for explaining the operation in a sixth embodiment of the present invention with respect to reproduction of contents.

Referring to FIG. 17, in step S101, the demultiplexing program stored in the storage device 504 is loaded on the memory 501, contents are read out from the storage device 505, and encoded IPMP data, encrypted audio data, encrypted video data, and encrypted system data are demultiplexed and stored in the code area of the memory 501. Then the procedure advances to step S102.

In step S102, the IPMP decoding program stored in the storage device 504 is loaded on the memory 501, encoded IPMP data stored in the code area is decoded, and encrypted audio patent code data in the IPMP data is decrypted and stored in the data area of the memory 501. Then the procedure advances to step S103.

In step S103, the decoded audio patent code is compared with the audio patent code stored in the storage device 504. In the case of "identical", the procedure advances to step S104. In the case of "nonidentical", the procedure moves to step S106.

In step S104, the decrypting program stored in the storage device 504 is loaded on the memory 501, and the encrypted audio data stored in the memory 501 is decrypted and stored in the code area of the memory 501. Then the procedure advances to step S105.

In step S105, the audio decoding program stored in the storage device 504 is loaded on the memory 501, and the encoded audio data stored in the code area of the memory 501 is decoded and the audio data is stored in the data area of the memory 501. Then the procedure advances to step S106.

In step S106, the IPMP decoding program stored in the storage device 504 is loaded on the memory 501, encoded IPMP data stored in the code area is decoded, and encrypted video patent code data in the IPMP data is decrypted and stored in the data area of the memory 501. Then the procedure advances to step S107.

In step S107, the decoded video patent code is compared with the video patent code stored in the storage device 504. In the case of "identical", the procedure advances to step S108. In the case of "nonidentical", the procedure moves to step S110 (see FIG. 18). Then the procedure advances to step S108.

In step S108, the decrypting program stored in the storage device 504 is loaded on the memory 501, and the encrypted video data in the memory 501 is decrypted and encoded video data is stored in the code area of the memory 501. Then the procedure advances to step S109.

In step S109, the video decoding program stored in the storage device 504 is loaded on the memory 501, and the encoded video data stored in the code area of the memory 501 is decoded and stored in the data area of the memory 501. Then the procedure advances to step S110.

In step S110, the IPMP decoding program stored in the storage device 504 is loaded on the memory 501, encoded IPMP data stored in the code area is decoded, and encrypted system patent code data in the IPMP data is decrypted and stored in the data area of the memory 501. Then the procedure advances to step S111.

In step S111, the decrypted system patent code is compared with the system patent code stored in the storage device 504. In the case of "identical", the procedure advances to step S112. In the case of "nonidentical", the procedure moves to step S114.

In step S112, the decrypting program stored in the storage device 504 is loaded on the memory 501, and the encrypted system data stored in the memory 501 is decrypted and stored in the code area of the memory 501. Then the procedure advances to step S113.

In step S113, the system decoding program stored in the storage device 504 is loaded on the memory 501, and the encoded system data stored in the code area of the memory 501 is decoded and stored in the data area of the memory 501. Then the procedure advances to step S114.

In step S114, the contents execution program stored in the storage device 504 is loaded on the memory 501, system data in the data area of the memory 501, if any, is read, and contents display/outputting is started. If moving images are displayed according to control based on the system data, and if corresponding video data exists in the data area, the data is synthesized according to the control to be displayed on the monitor 507. If sound is output, and if corresponding audio data exists in the data area, the data is output to the audio device according to the control to be output through a speaker or the like. The procedure ends when display/output of contents data in the data area is completed.

The CPU 500 may start the communication program stored in the storage device 504 to send out contents in the memory 501 to the external over the communication line 508, or may store the contents in the storage device, if necessary.

It is possible to easily discrimination, by the above-described selecting procedure, the existence of licenses with respect to intellectual property rights in technological aspects (e.g., patent rights and utility model rights) necessary for producing or reproducing contents. Reproduction can be controlled according to the result of discriminating. Thus, it is possible to improve the facility with which intellectual property rights in technological aspects, i.e., patents or the like, are managed and protected.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. A data processing apparatus, comprising:
    input means for inputting electronic information representing material data into said apparatus;
    encoding means for encoding the electronic information representing material data to form encoded contents data;
    input means for inputting list data of a patent necessary for encoding the electronic information in said encoding means or for decoding the encoded data;
    generation means for generating an encryption key based on the list data of the patent;
    encryption means for encrypting the encoded contents data by using the encryption key;

list data encryption means for encrypting the list data of the patent;

forming means for forming intellectual property management information including the encrypted list data of the patent; and addition means for adding to the encoded contents data encrypted by said encryption means the intellectual property management information formed by said forming means.

2. An apparatus according to claim 1, wherein said encoding means forms MPEG-4 encoded data.

3. An apparatus according to claim 1, wherein the list data of the patent includes a registration country and a patent number.

4. An apparatus according to claim 1, wherein the material information includes image data.

5. An apparatus according to claim 1, wherein the material information includes audio data.

6. A data processing method comprising:

an input step of inputting electronic information representing material data into an apparatus;

an encoding step of encoding the electronic information representing material data to form encoded contents data;

an input step of inputting list data of a patent necessary for encoding the electronic information in said encoding step or for decoding the encoded data;

a generation step of generating an encryption key based on the list data of the patent;

an encryption step of encrypting the encoded contents data by using the encryption key;

a list data encryption step of encrypting the list data of the patent;

a forming step of forming intellectual property management information including the encrypted list data of the patent; and an addition step of adding to the encoded contents data encrypted in said encryption step the intellectual property management information formed in said forming step.

7. A computer-readable storage medium storing data processing program codes comprising:

a code for an input step of inputting to an apparatus electronic information representing material data;

a code for an encoding step of encoding the electronic information representing material data to form encoded contents data;

a code for an input step of inputting list data of a patent necessary for encoding the electronic information in said encoding step or for of decoding the encoded data;

a code for a generating step of generating an encryption key based on the list data of the patent;

a code for an encrypting step of encrypting the encoded contents data by using the encryption key;

a code for a list data encryption step of encrypting the list data of the patent;

a code for a forming step of forming intellectual property management information including the encrypted list data of the patent; and a code for an addition step of adding to the encoded contents data encrypted in said encryption step the intellectual property management information formed in said forming step.

* * * * *

UNITED STATES PATENT AND TRADEMARK OFFICE
CERTIFICATE OF CORRECTION

PATENT NO. : 7,231,043 B2  Page 1 of 1
APPLICATION NO. : 09/879913
DATED : June 12, 2007
INVENTOR(S) : Mitsuru Maeda It is certified that error appears in the above-identified patent and that said Letters Patent is hereby corrected as shown below:

(56) References Cited

"WO 9948296 A1" should read --WO 99/48296 A1--

Col. 20, line 36, "discrimination," should read --discriminate,--

Signed and Sealed this

Twenty-fifth Day of December, 2007

JON W. DUDAS
*Director of the United States Patent and Trademark Office*